Dec. 24, 1963         W. S. GUBELMANN         3,115,300
KEY CONTROLS FOR CALCULATING MACHINES
Original Filed Nov. 6, 1950                16 Sheets-Sheet 1

INVENTOR
William S. Gubelmann, deceased
by Walter S. Gubelmann, executor
By Burgess, Ryan & Hicks Dec. 24, 1963  W. S. GUBELMANN  3,115,300
KEY CONTROLS FOR CALCULATING MACHINES
Original Filed Nov. 6, 1950  16 Sheets-Sheet 4

INVENTOR.
William S. Gubelmann, deceased
by Walter A. Gubelmann, executor
BY
Burger, Ryan & Hicks Dec. 24, 1963  W. S. GUBELMANN  3,115,300
KEY CONTROLS FOR CALCULATING MACHINES
Original Filed Nov. 6, 1950  16 Sheets-Sheet 5

INVENTOR.
William S. Gubelmann, deceased
By Walter S. Gubelmann, executor
BY
Burgess, Ryan, Hicks INVENTOR.
William S. Gubelmann, deceased
by Walter S. Gubelmann, executor
BY
Burgess, Ryan & Hicks Dec. 24, 1963  W. S. GUBELMANN  3,115,300
KEY CONTROLS FOR CALCULATING MACHINES
Original Filed Nov. 6, 1950  16 Sheets-Sheet 8

INVENTOR.
William S. Gubelmann, deceased
By Walter A. Gubelmann, executor
BY
Burgess, Ryan & Hicks Dec. 24, 1963 W. S. GUBELMANN 3,115,300
KEY CONTROLS FOR CALCULATING MACHINES
Original Filed Nov. 6, 1950 16 Sheets-Sheet 10

INVENTOR.
William S. Gubelmann, deceased
by Walter S. Gubelmann, executor
BY
Burger, Ryan-Hicks Dec. 24, 1963   W. S. GUBELMANN   3,115,300
KEY CONTROLS FOR CALCULATING MACHINES
Original Filed Nov. 6, 1950                16 Sheets-Sheet 11

INVENTOR.
William S. Gubelmann deceased
by Walter S. Gubelmann, executor
BY
Burgers, Ryan + Hicks

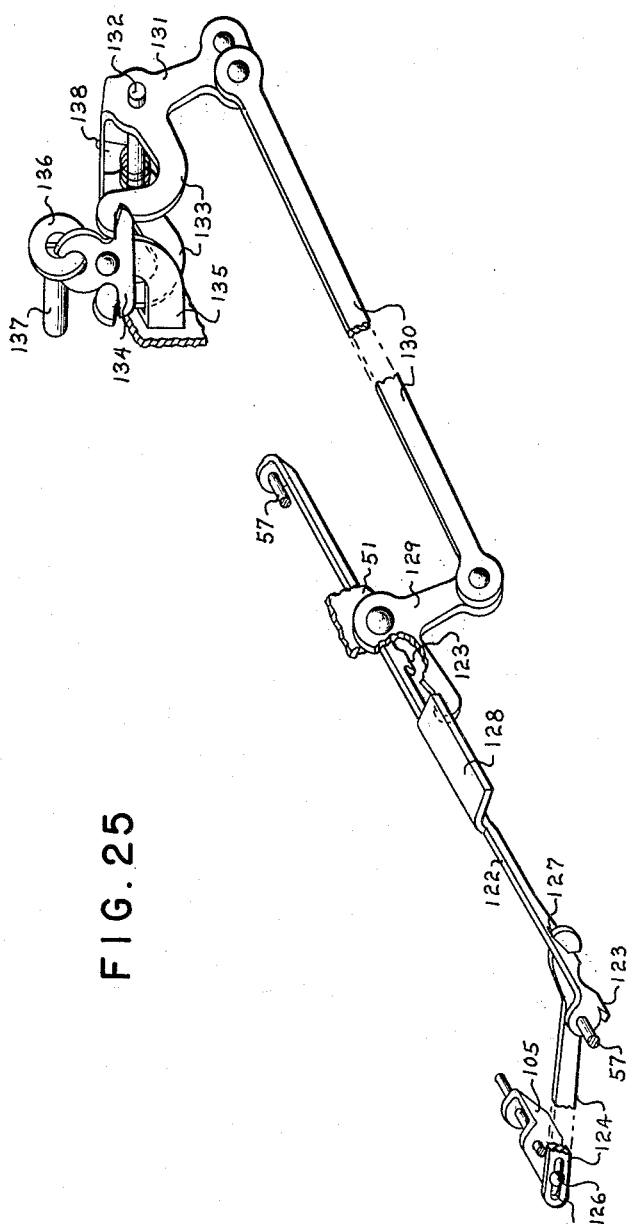

Dec. 24, 1963 W. S. GUBELMANN 3,115,300
KEY CONTROLS FOR CALCULATING MACHINES
Original Filed Nov. 6, 1950 16 Sheets-Sheet 13

INVENTOR.
William S. Gubelmann, deceased
by Walter S. Gubelmann, executor
BY
Burgess, Ryan + Hicks Dec. 24, 1963   W. S. GUBELMANN   3,115,300
KEY CONTROLS FOR CALCULATING MACHINES
Original Filed Nov. 6, 1950   16 Sheets-Sheet 14

INVENTOR.
William S. Gubelmann, deceased
By Walter S. Gubelmann, executor
BY
Burgess, Ryan & Hicks

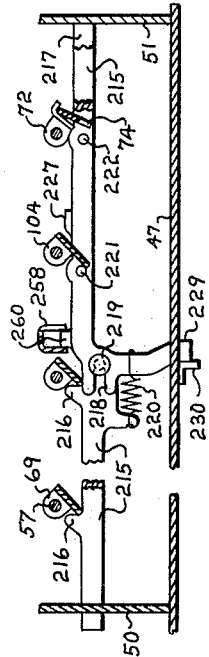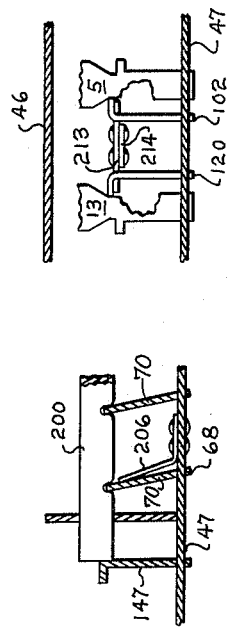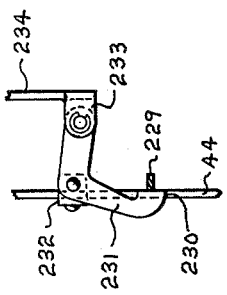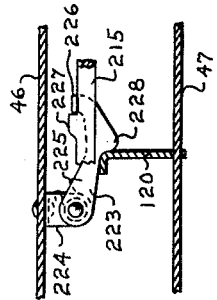

Dec. 24, 1963  W. S. GUBELMANN  3,115,300
KEY CONTROLS FOR CALCULATING MACHINES
Original Filed Nov. 6, 1950  16 Sheets-Sheet 16

INVENTOR.
William S. Gubelmann, deceased
By Walter S. Gubelmann, executor
BY
Burgess, Ryan - Hicks 3,115,300
KEY CONTROLS FOR CALCULATING MACHINES
William S. Gubelmann, deceased, late of Convent, N.J., by Walter S. Gubelmann, executor, Oyster Bay, N.Y., assignor to Realty & Industrial Corporation, Morristown, N.J., a corporation of Delaware
Original application Nov. 6, 1950, Ser. No. 194,273, now Patent No. 2,969,177, dated Jan. 24, 1961. Divided and this application Dec. 1, 1960, Ser. No. 73,141
35 Claims. (Cl. 235—63)

This invention relates to improvements in calculating machines, and also to keys and key locking mechanisms. This application is a division of the applicant's application S.N. 194,273, filed November 6, 1950, for Partial Product Calculating Machine, now Patent No. 2,969,177, issued January 24, 1961.

An object of this invention is to provide new and improved inter-row locks in calculating machines having variously arranged operation control keys and a field of factor control keys.

Another object of the invention is to provide a novel and improved device for locking the factor keys in operated position, by operation of any cycling key, so that, once a cycling key is depressed, changing of a factor key during computation operations of the machine is not possible.

Still another object of the invention is to provide a novel and improved key lock whereby, if a factor key is only partly depressed, depression of a cycling key sufficiently to initiate operations of the machine is blocked.

Another object of the invention is to provide, in a calculating machine, new and improved means for automatically releasing the operated multiplier control, plus control or minus control keys, for automatically releasing any operated factor key when the plus and minus keys are the operated control keys, and for manually clearing the factor keys.

A further object of the invention is to provide, along with the features of the preceding object, a manipulative means movable from a normal ineffective position to a second position for preventing the automatic release of the operated factor keys with the plus and minus control keys, and also movable to a third position for preventing both the automatic and the optional manual release of the factor keys.

Still another object of this invention is to provide a key operation blocking slide bar means for the three-fold purpose of preventing simultaneous operation of an addition operation control key with a subtraction operation control key, preventing operation of the subtraction operation control key when a non-entry key is operated, which non-entry key is used simultaneously with the addition conrtol for preventing addition of the customary unit one in a quotient register as when adding a dividend in a dividend register, and of preventing operation of the non-entry key when a subtraction operation control key is operated.

Still a further object of this invention is to provide, in a calculating machine having a division initiating key, a multiplication initiating key, and a non-entry key for preventing the usual but sometimes undesired operation of a quotient register as when adding a dividend in a dividend register; means operable upon manipulation of the initiating keys in different rows for preventing undesired operation of the non-entry key, located in still another row.

Another object of this invention is to provide a calculating machine operable for performing arithmetical calculations of division and wherein a trial quotient is selected upon comparison of multiples of the highest order of the divisor with the highest order of the dividend and including a division initiating device operable for instituting division operations of the machine, and a number of divisor set-up devices arranged in denominational orders and operable for representing divisors, a lock device normally blocking operation of the division initiating device and responsive to operation of any one of the set-up devices in the highest order of the set-up devices for allowing operation of the initiating device.

Still another object of the invention is to provide an improved calculating machine in which there are a transversely movable carriage, a dividend register and a quotient register carried by the carriage, a carriage moving means for moving the carriage and therethrough successively changing the ordinal relationship of the registers, a computing mechanism for performing the arithmetical calculations of division by reducing the dividend in said register in a manner closely analogous to the manual procedure of long division and similarly entering successive quotient digit values in the quotient register and for successively controlling the carriage moving mechanism to move the carriage for associating the next lower denominations of the registers with the computing mechanism, and a division initiating device operable for starting the operations of said computing mechanism, in combination with a locking means normally blocking operation of the initiating device and operable for allowing operation of the initiating device, the locking means being operated by the carriage upon movement of its extreme position where the highest orders of the registers are associated positionally with the computing mechanism and the fullest capacity of the registers is available.

A further object is to provide a calculating machine in which the advantages of the preceding object are combined with the features of a divide position key, or extreme right position key, for controlling the carriage moving means to automatically move the carriage to its highest order extreme position and thereby operating the divide key lock means for allowing operation of the division initiating device.

Still another object of this invention is to provide an improved calculating machine in which there are a transversely movable carriage, multi-order registers carried by said carriage, a carriage moving mechanism for moving a carriage leftwardly and rightwardly and thus changing the ordinal position of the registers, and a tabulating mechanism operable by movement of the carriage to an extreme position for stopping the carriage moving mechanism and thus terminating movement of the carriage at an extreme position, an extreme left key and an extreme right shift key operable for controlling the carriage moving mechanism to operate for moving the carriage in the respective direction, together with latch means for holding any operated extreme shift key in operated position, the latch means being operable by the tabulating mechanism for releasing the operated extreme shift key, manipulative left and right shift keys momentarily operable for controlling the carriage moving mechanism to move the carriage one or more ordinal steps in the respective direction, and a locking slide bar operable by any one of the keys for preventing operation of the keys which are for controlling the carriage moving mechanism to operate for movement of the carriage in the opposite direction.

A further object of this invention is to provide an improved calculating machine in which there are an ordinally movable carriage, a carriage moving means operable for moving said carriage from one ordinal position to another, a cyclically operable mechanism for performing arithmetical calculations of multiplication and sequentially controlling said moving means to operate, the cyclic operations of said mechanism for certain multipliers consisting of certain functions and the operations of said mechanism for certain other multipliers consisting of certain other functions, a first plurality of multiplication control keys operable for initiating operation of said mechanism in accordance with said certain multipliers, a second plurality of multiplication control keys operable for initiating operation of said mechanism in accordance with said certain other multipliers, and a zero value control key operable for controlling the moving means to operate, combined with a slidable lock-member for preventing operation of a key of said first plurality with a key of said second plurality or with said zero value key and vice versa.

Further objects, advantages and features of this invention will be apparent from consideration of the following description as illustrated by the accompanying drawings of a preferred embodiment of the invention, in which drawings:

FIG. 25 is a fragmentary perspective view of the latch-down means for the carriage return key, the extreme left and right shift keys, and the mechanism operated by the tabulating mechanism for operating the latch-down means and thereby releasing the respective operated keys.

FIG. 29 is a fragmentary sectional elevational front view of several vanes and one transverse member of the inter-bank locking device.

FIG. 30 is a fragmentary sectional elevational front view of part of the inter-bank locking device, showing principally the carriage return key and a multiplier key, both also shown in FIGURE 1, and the locking devices therebetween.

FIG. 31 is a condensed fragmentary sectional elevational front view showing the latch-down means for the factor keys, the plus and minus keys and multiplier keys, and part of the automatic means for releasing these keys.

FIG. 32 is a fragmentary sectional elevational front view of control mechanism for the automatic release of the operated factor keys.

FIG. 33 is a top view of some of the parts in FIG. 31.

TOPICAL INDEX

1. General Description
2. Locks for Factor Keys
3. Locks of Multiplier Keys
4. Locks for Third Bank of Keys
5. Locks for Shift Keys
6. Divide Key Locks
7. Inter-Bank Locking Device
8. Preventing Manual and Automatic Clearing

1. *General Description*

The machine in which the present invention is embodied is disclosed in detail in the aforementioned parent application, Serial No. 194,273, now Patent No. 2,969,177 to which reference may be had for a complete disclosure not otherwise repeated herein. A brief summary of the machine and its operations, however, is presented herewith in order to facilitate understanding of the invention and its interaction with various mechanisms of the machine.

Figure 1:
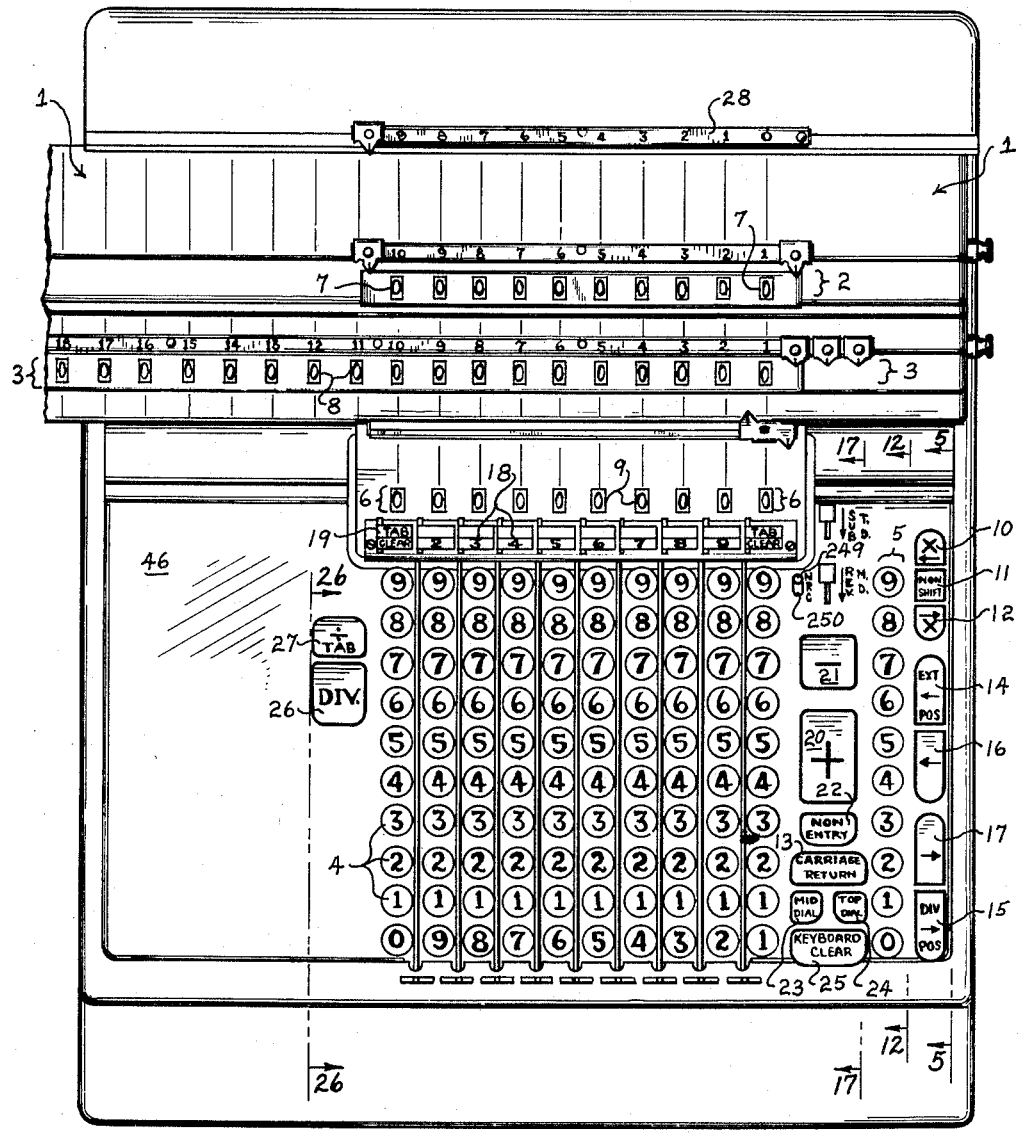
FIG. 1 is a general top view of the machine, the leftward extension of the register carriage being partly cut away.

The machine shown in FIG. 1 embodies predetermined partial product and quotient devices, a shiftable carriage 1 which carries accumulator registers 2 and 3, several banks of keys 4 for setting up factors in various arithmetical calculations, and a bank of multiplier keys 5. This machine, commonly known as a "four-rules calculator," performs the arithmetical calculations of addition, subtraction, multiplication and division automatically. This machine also embodies a tabulating mechanism and an automatically powered driving mechanism which includes three actuating units for motivating the multiplying, dividing and carriage shifting mechanisms. Hereinafter, each actuating unit is referred to respectively as the multiplying, dividing, and carriage power unit.

Results and factors of the various computations are indicated in ordinally disposed dials of registers 2, 3 and 6 as follows: register 2, carried by the carriage 1, can indicate the multiplier, quotient, or the number of items in addition or subtraction as the case may be and, alternatively, the complement of any of the foregoing. Register 3, also carried by the carriage, can indicate the product, dividend, sum, diverence, or such complements thereof as are desired. Stationary register 6 shows for easy reading a factor which is currently set up on keys 4. Each register comprises ordinally disposed dials or number wheels as at 7, 8 and 9, the numerals of which are visible through suitable apertures on the respective overlying cover plates.

Multiplication in this machine is direct, as distinguished from repeated addition, in that the machine multiplies in a manner closely analogous to the method used in mental computations. Representations of products for digits 0 to 9 times 1 to 9 are provided for selection and setup respectively in accordance with the separate digits of the multiplicand and each multiplier digit. The partial products thus obtained are integrated into the final product. Depression of a key 4, value 1 to 9, in a bank selects the products of that value times the digits 1 to 9. Each multiplier key 5 for values 1 to 9 serves as an initiatory control for effecting operation of the computing mechanism and exercises a control over the computing mechanism for setting up the multiplicand digit selected partial products that have resulting relation with the value of the depressed multiplier key. A single cycle of multiplying operations registers the product of the entire multiplicand and the one digit multiplier, and also includes the operation of automatically initiating an ordinal shift of the carriage. Depression of the "0" value key 5 serves to initiate an ordinal shift of the carriage 1 without first having to excite the computing mechanism.

Selectively operable keys 10, 11 and 12 are provided for controlling the direction of shift and non-shift of the carriage, as for multiplication. With key 10 in depressed position, the automatic ordinal shift of the carriage will be leftward as seen in FIGURE 1, but with key 12 in depressed position instead, the ordinal shift of the carriage will be rightward, as indicated by the arrows on these keys. In each instance the carriage will shift in the opposite direction to a preselected start position with the use of carriage return key 13. With the non-shift key 11 in depressed position the automatically operated shift initiating means is normally disabled.

A single momentary depression of key 14 or 15 initiates an uninterruptable shift of the carriage to the extreme end position in the direction indicated by the arrow on each of these keys. A single momentary depression and release of key 16 or 17 initiates a single step movement of the carriage in the direction of the arrow on these keys. Prolonged holding down of a key 16 or 17 causes the carriage to shift ordinally (step-by-step) in the respective direction to a preselected ordinal position or, if no preselection has been made, to the extreme position.

The tabulating mechanism is so constructed as to stop the carriage at an ordinal position by directly effecting blocking operation of the carriage traversing mechanism rather than solidly abutting the carriage itself. The tabulating mechanism is brought into operation automatically each time the carriage shifts to either end position. A similar operation of the tabulating mechanism will also occur at an intermediate ordinal position, as with the use of keys 13, 16 and 17, provided that preselection of that position is made by depression of an appropriate one of the tabulator keys 18, which are self-lockable, and are releasable immediately upon depression of a "tab clear" key 19 at either end of the horizontal row of tabulator keys.

Addition and subtraction calculations are performed by automatically treating the addend and subtrahend, respectively, as multiplicands, and multiplying these factors by "1." Add key 20 and subtract key 21 are in effect "1" value multiplier keys, but the cycles of operations instituted thereby do not include the operation of initiating a shift cycle. The product thus obtained of a subtrahend is registered subtractively by the dials of the register therefor. Selectively settable means is also provided for effecting subtractive registration of other products.

Depression of "non entry" key 22 simultaneously with add key 20 or subtract key 21 blocks entry of the item "1" in the register therefor. Zeroizing keys 23 and 24 initiate clearing respectively of the middle or product register 3 and of the top or multiplier register 2, and key 25 effects clearing, i.e., release of depressed keys 4. Keys 23, 24 and 25 are clustered with carriage return key 13 so as to allow convenient simultaneous, optionally grouped, operation of these keys.

Heretofore, division computations have been performed by repeated subtraction or logarithmic processes. In this machine, division is accomplished directly by structural elements in a manner analogous to the method corresponding to the well known mental procedure in "long division." The mechanism used for a calculation in division includes means for deriving trial quotient digits and also makes use of the multiplying mechanism. This means that when a dividend has been set up in register 3 and a divisor has been set up in keys 4, upon actuation of either divide key 26 or 27 the machine automatically selects a trial quotient and causes the multiplying mechanism to obtain the product of the divisor times the trial quotient digit. The product thus obtained is then subtractively registered in register 3.

Figure 2:
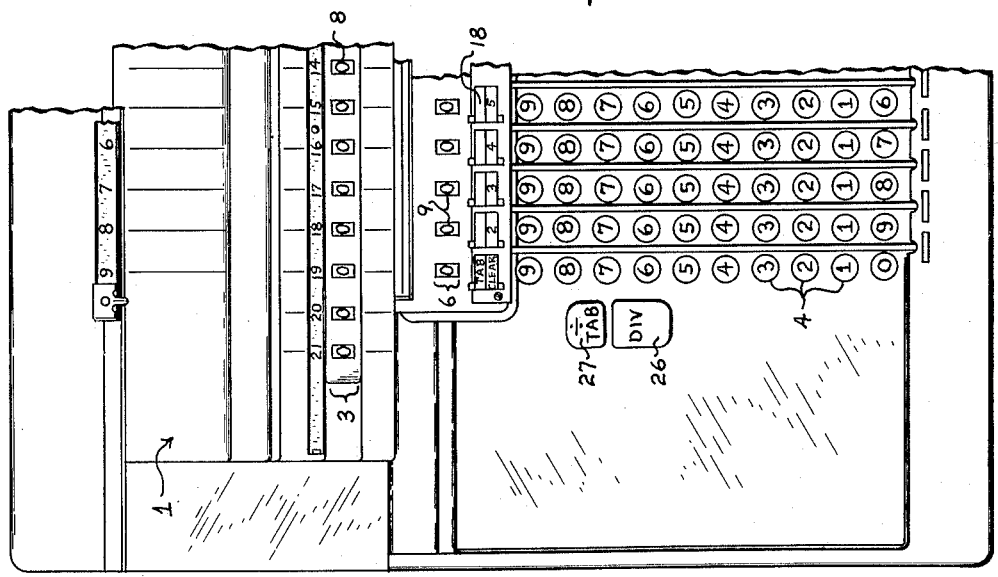
FIG. 2 is a fragmentary general top view of the machine, with the carriage shown as moved to its rightmost position.

Key 26 or 27 may be depressed only when the machine is properly set up for a division computation. The machine is prepared for such a computation as follows:

The carriage is shifted to its rightmost position, as illustrated in FIG. 2, preferably by the depression of extreme shift key 15, FIG. 1. At this rightmost position of carriage 1, FIG. 2, the 19th one of dials 8 is then in alignment with the leftmost bank of keys 4 to receive a registration therefrom. The dividend is then set up in the multiplicand selecting mechanism by keys 4, preferably with the highest order of the dividend in the leftmost bank of keys 4. With the use of add key 20 (FIG. 1) the dividend is registered in register 3 with the highest order appearing in the 19th order dial 8, FIG. 2, the lower of the two highest order inboard dials. An inboard dial is one which is in engaging relation with the entry and carry mechanism of the main body of the machine. Non-entry key 22 (FIG. 1) is depressed simultaneously with add key 20 whereby registering of the item "1" in register 2 is blocked. The divisor is then set up in the multiplicand selecting mechanism by keys 4 with the highest order real digit, i.e., a digit other than "0" in the leftmost bank. In addition to making a selection of relative partial products, the depressed key 4 in the leftmost bank also effects selection of quotient representations in the dividing mechanism relative to the value of that key.

Depression of either divide key 26 or 27 is normally blocked by key lock means which are rendered ineffective only when both the carriage is in its rightmost position and a real digit key 4 is depressed in the leftmost bank. The key lock mechanism includes, among others, hold-down latch means for holding a cycling key in operated position until the final phase of the operation instituted thereby is completed, and an inter-bank locking device for preventing actuation of a cycling key in one bank while another cycling key in another bank is in operated position, and while a factor key is partially depressed.

Operation of either key 26 or 27 excites a mechanism which conditions the machine (without upsetting current operational setups that may be incongruous with requirements for division) for subtractive entry of products and for sequential operations of the division, multiplying and carriage traversing mechanisms, the latter to shift the carriage leftward. The conditioning mechanism also initiates the first cycle of operations of the dividing mechanism for the division process. With the use of key 27, the conditioning mechanism also renders the tabulating mechanism effective to cause termination of the division process upon registration of any desired predetermined number of quotient digits. First, however, the tabulating mechanism must be set by depression of that tabulator key 18 which corresponds with the number of digits desired. With the use of key 26, whether or not a tabulator key selection is made, or with the use of key 27 when a tabulator key selection is not made, the tabulating mechanism will cause termination of the division process only when the ordinal capacity of the machine is reached.

In arithmetic division processes the problem is said to be "solved" whenever the dividend is eliminated, i.e., reduced to "0." Sensing means, one for each inboard dial 8 in register 3, are all movable together and movement is obstructed when a dial 8 is displaced from its "0" position, indicating a remainder. Accordingly, turning of all the dials 8 to "0" position enables the sensing means to move, whereupon the sensing means effects termination of the division process automatically, there being no remainder and no reason for continuing the operations. Both the eliminated dividend sensing means and the tabulating mechanism motivate a mechanism which terminates the division process after the final true quotient digit is registered in register 2.

Selection of a trial quotient value is made from representations of quotient values provided for dividend numbers ranging from 0 to 99 divided by divisor digits 1 to 9, both inclusive. The trial quotient first obtained may be an "over-estimation." In that case the mechanism automatically reduces the trial quotient by "1" and makes one or more further attempts to obtain the true quotient. When the true quotient, a single digit, is so obtained, it is registered in register 2. Failures to obtain the true quotient are evidenced by an over-draft from the dividend, which is automatically cancelled out by adding back into register 3 the amount subtracted therefrom, i.e., the product of the divisor times the trial quotient which proved to be too large. In the majority of instances the trial quotient proves to be the true quotient. The need for repeating more than once the attempt to obtain the true quotient integer is relatively infrequent. "Underestimation," i.e., selection of a too small quotient integer, is not possible, due to the positive stop arrangements provided.

The preferred method of carrying out a cycle of operations in a division process in this machine is as follows: The value of the dividend digits in the two highest inboard orders of dials 8 of register 3, FIG. 8, the 20th and 19th dials, is sensed. In the initial cycle, the value in 20th dial is 0, and in the 19th dial the value is that of the highest order integer of the dividend. In accordance with the sensed dividend value, the significant quotient value representation of the divisor selected representations is set up. Then the set up quotient representation is sensed and concurrently the multiplier controls in the computing mechanism are adjusted automatically for that trial quotient value. Next, a cycle of operations of the multiplying mechanism is instituted automatically, whereby the product of the divisor factor (the multiplicand) times the trial quotient digit (the multiplier) is subtracted from the dividend in register 3, and the trial quotient is registered in the first inboard order dial 7 of register 2, FIG. 1, the 10th or leftmost dial in the initial phase of the division process, at which time that dial is standing in alignment with the numeral "0" on the decimal marker channel 28.

When subtraction of the product does not result in an overdraft, as would be indicated on register 3, a cycle of operations is instituted automatically for shifting the carriage leftward one step. In the final phase of the shift cycle, operation of the division power unit is initiated again, this time automatically except, however, when the carriage has been shifted to its leftmost position, or to a preselected ordinal position, or whenever the dividend has been eliminated, showing that a solution has been reached. In the event an overdraft occurs, the overdrafting amount and the two large quotient digit entries are withdrawn from the respective registers 3 and 2. At the same time the dividing mechanism automatically reduces the value of the two large quotient digit by "1" and adjusts the multiplier controls accordingly. The multiplying mechanism is then automatically caused to obtain the product of the divisor factor times the reduced trial quotient value and to reduce the dividend by that product. If the value of a set up trial quotient or of a reduced trial quotient is "0," a shift cycle of operations for shifting the carriage one step leftward is instituted automatically, instead of initiating operation of the multiplying power unit.

Means are also provided for selectively indicating a reference point such as a decimal between adjacent orders of registers 2 and 3 and of the banks of keys 4.

The carriage 1 is shiftably supported by the main frame of the machine. In addition to the register mechanisms, including a dial and several gears in each order, the carriage also carries components of clearing and main carry mechanisms, and components of an add-subtract control and carry mechanism for those orders of the product register that may be outboard, i.e., not engageable by the entry and carry mechanism of the main body.

Figure 3:
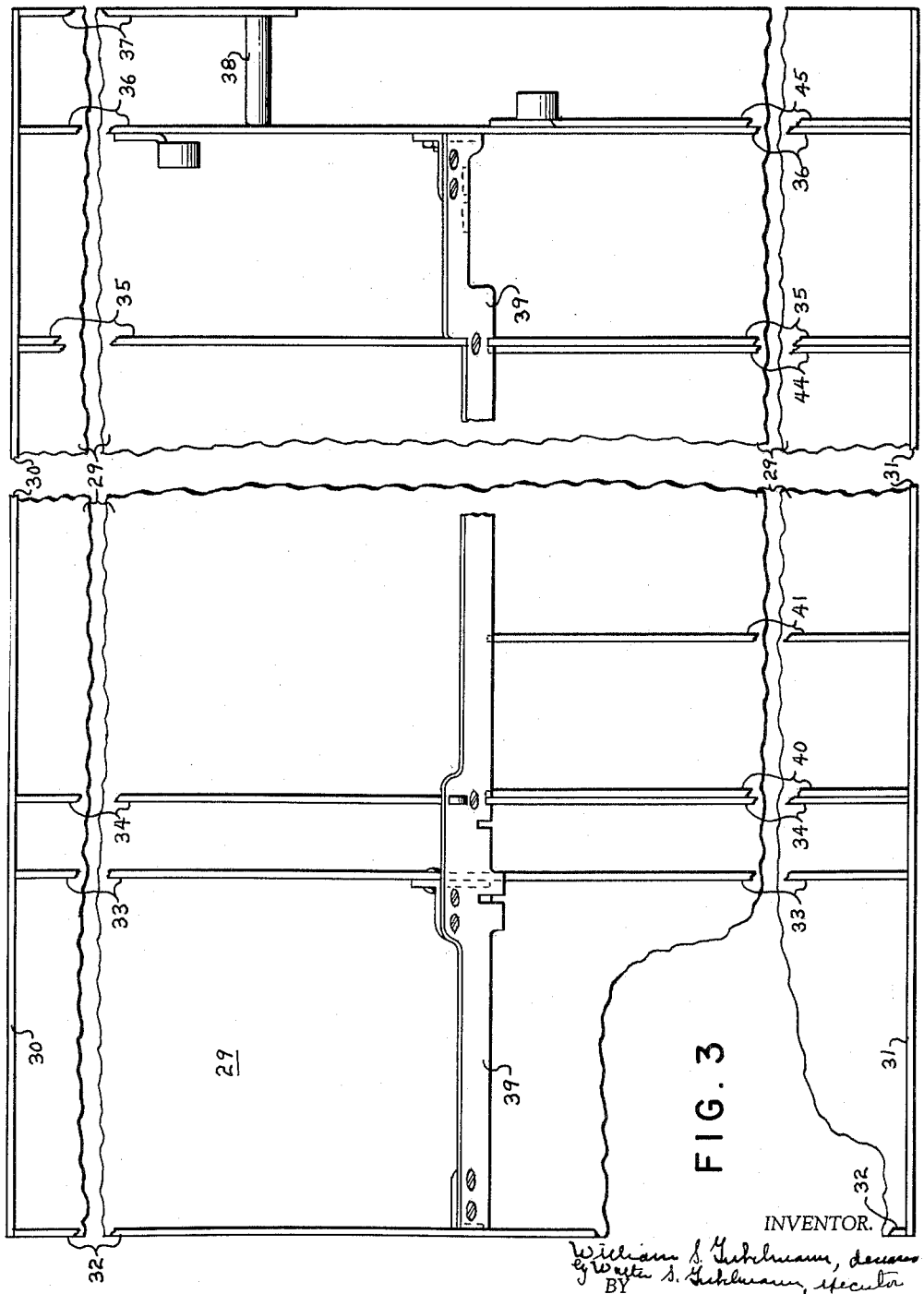
FIG. 3 is a condensed fragmentary plan view of the machine's general frame members, the view omitting other parts for clarity.

The main frame of the machine embodying the invention includes base plate 29 (FIG. 3) to which rear and front plates 30 and 31 are fastened respectively, and plates 32 to 36 inclusive, which extend parallelly between the front and rear plates and are secured thereto and to base 29. The rightmost plate 37 is a short plate secured to the rear and base plates, and the upper forward end of plate 37 is secured to plate 36 by means of rod 38. A cross member 39 is secured to the upper faces of plates 32 to 36, inclusive, for making the frame structure more rigid.

Companion plates 40 to 45 inclusive are secured to each other in parallel planes by suitable means such as by shaft sections (not illustrated herein) the ends of which are formed for threading one section to the other and for clamping the respective plate therebetween. The unit thus formed is fastened removably to plates 34 and 36 as by bolts which are not shown. This unit supports mechanism operated by various keys. Another frame unit, which supports the keys and the locking mechanisms therefor, is formed of the following plates: top or cover 46, FIG. 4, bottom 47, front 48, rear 49, left side plate 50 and right side plate 51. This keyboard unit may be removably secured to plate 32 (FIG. 3) and to companion plates 40 and 45 in any well known manner.

Figure 4:
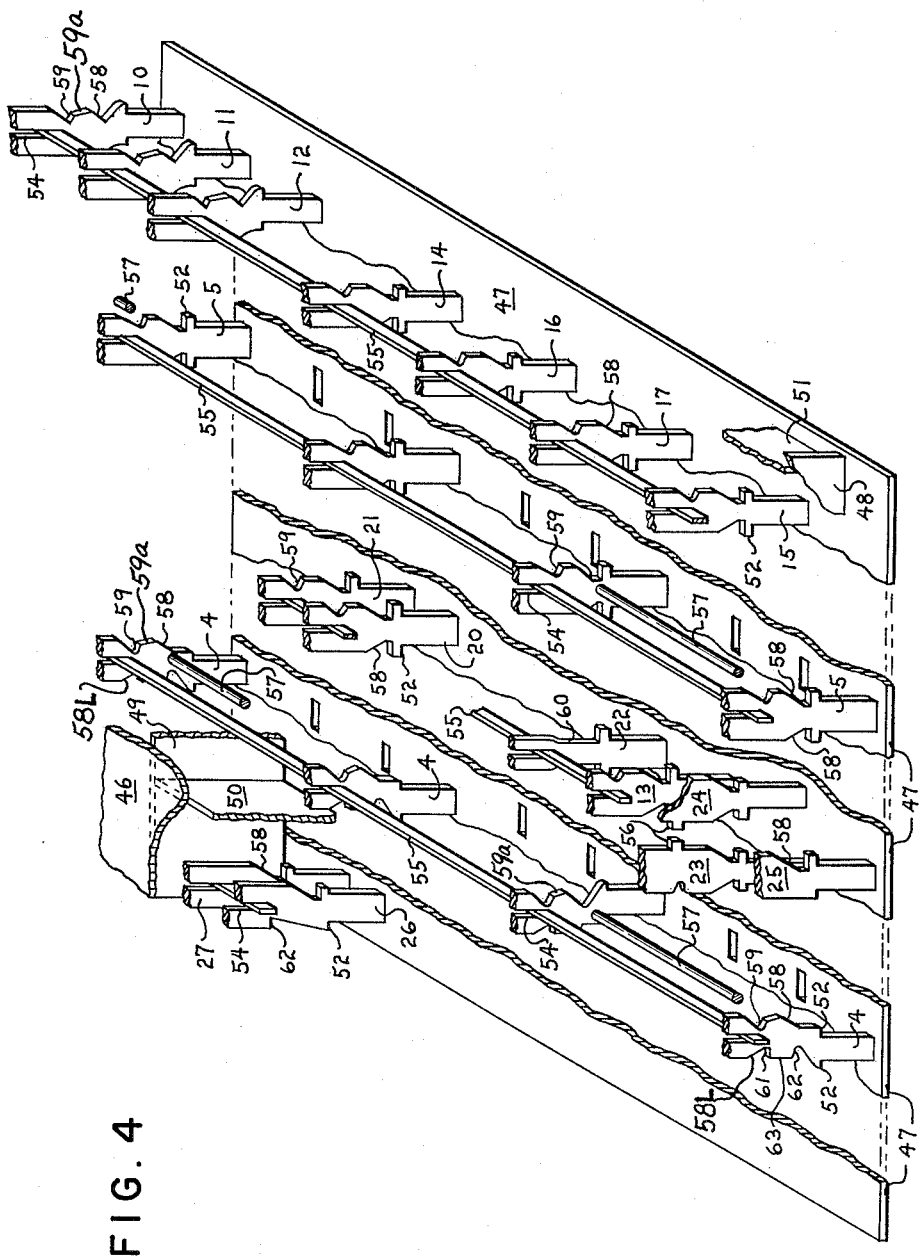
FIG. 4 is a condensed fragmentary perspective view of the keyboard assembly, showing principally the configurations of some of the various keys in their respective rows, other keys being omitted for clarity.

Referring to FIG. 4, top and bottom plates 46 and 47 are suitably slotted for slidably receiving the shanks of factor keys 4, cycling keys 5, 13–17, 20, 21, 26 and 27, clearing keys 23–25, and control keys 10, 11, 12 and 22. Toward its depending end, each of these key shanks is formed with a shoulder 52, or the like, on its left and right faces and is provided with a spring 53 (FIG. 5) which is supported on bottom plate 47 and presses upwardly against the respective shoulders 52 for returning and holding the key in its normal or up position.

Referring to FIG. 4, each of these key shanks, except those of keys 23 and 24, is formed with a slot 54, through which a suitable bar 55, or the like, extends in each bank for guiding the keys and for limiting the extent of their downward and upward strokes. All the bars 55 are removably secured on the keyboard frame for contact with plate 46. The shank of each key 23 and 24 is formed with an ear 56 which contacts the underside of top plate 46 to limit the upward stroke of these keys. The downward stroke of these keys is also limited, as will be described later herein.

Rightward of each bank of keys, except the bank of divide keys, an elongated rod 57 is removably secured to the keyboard frame, in proximity to top plate 46. Rods 57, as will be described, support various hold-down latch members for holding the keys in the related bank in operated position.

In the first three banks from right to left, the shank of each key 14, 15, 16, 17; 5; 13, 20, 21, 23 and 24 is formed with an incline or camming surface 58 on its right and left edges upward from the respective shoulder formation 52 thereon. Shift direction set-up keys 10, 11, and 12, and keyboard clear key 25 are each formed with an incline 58 only on its right edge. With the exception of non-entry key 22, and clearing keys 23, 24 and 25, each shank of the three banks of keys is suitably recessed on its right edge upward from incline 58 to form latch-down surface 59. In one preferred form, non-entry key 22 is formed with straight edges 60 upward from its shoulder formations 52.

The right edge of the shank of each key 4 is formed with an incline 58 upward from shoulder formation 52 and is recessed upward from incline 58 to form latch-down surface 59. A relief surface 59a, between latch-down surface 59 and incline 58, is provided so that the rightmost extent of the latch-down surface 59 is less than that extent of the incline 58 and provides for positive release of a key when another key is depressed in the same row. The left edge of these key shanks is suitably recessed to form latch-down shoulder 61 and latch-up shoulder 62 with an outward vertical blocking edge 63 therebetween, and upward from shoulder 61 an incline 58L is formed.

The right edge of each of the divide key shanks, 26 and 27, is also formed with an incline 58 upward from shoulder 52 and the left edge of each shank is suitably recessed to form latch-up shoulder 62.

Figure 6:
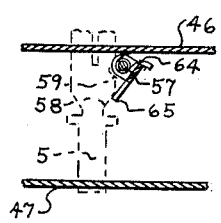
FIG. 6 is a fragmentary sectional elevational front view of one of the individual multiplier key latch-down means, the respective multiplier key of FIGURE 1 being shown in phantom.
Figure 7:
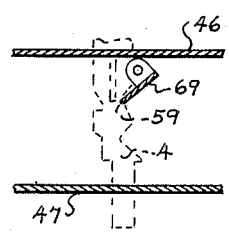
FIG. 7 is a fragmentary sectional elevational front view of one of the factor key latch-down means, one of the factor keys of FIGURE 1 being shown in phantom.

The various latch-down members are generally similar to the one illustrated in FIG. 6; they will, however, be given individual reference numerals for clarity. These latch-down members are pivotally mounted on rods 57 and are influenced clockwise, against the right edge incline 58 of the related key by torsion spring 64, tensioned between the respective latch-down member and plate 46. Depression of the related key (key 5 being illustrated in phantom) rocks the latch-down member counter-clockwise against the tension of spring 64 and when latch-down surface 59 moves down slightly below the depending edge 65 of the latch-down member, spring 64 swings the member clockwise to overlie surface 59 thereby to hold down the key depressed as illustrated in FIG. 7, a key 4 being shown here in phantom.

Figure 8:
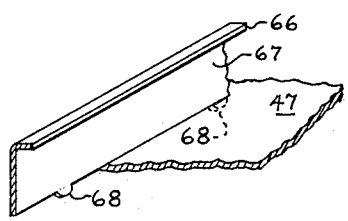
FIG. 8 is a fragmentary perspective view of one of the vanes of the inter-bank locking device.

The inter-bank locking devices, which are described further below, comprise a plurality of lock vanes, generally similar to the one illustrated in FIG. 8, of which certain vanes will be given individual reference numerals for clarity. The upper portion of each vane, unless otherwise described, is formed with a flange 66, bent over at a generally right angle to the main vane body 67, and each vane is fulcrumed on bottom plate 47, as by spaced depending vane lugs 68 being received in suitable slots therefor on plate 47.

2. *Locks for Factor Keys*

Illustratively, ten banks of ten keys 4 (FIG. 1) in each bank are shown. The first or foremost key in each bank is a zero key, and they have been numbered 1 to 0, from right to left, for the convenience of the operator. When depressed, a zero key serves only to clear, i.e., to effect release of any other depressed key 4 of the respective bank, as will be described herein.

Figure 10:
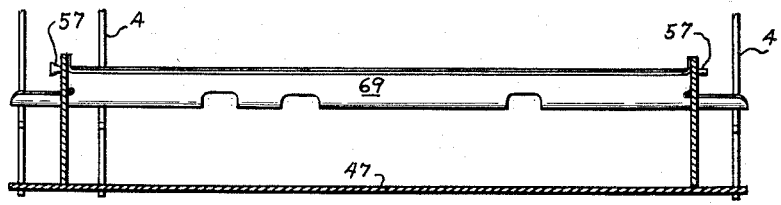
FIG. 10 is a right side sectional elevational view of the latch-down means for one bank of the factor keys of FIGURE 1, some keys being omitted for clarity.

An elongated hold-down latch 69 (FIG. 10) is provided for each bank of keys 4 for holding any key of its bank in depressed position. Each hold-down latch 69 is formed at its ends for pivotal mounting on rod 57, and is spring influenced clockwise against the right edge incline of the key shanks of the related bank. On depression of a key 4, the related hold-down member is oscillated, as described, to engage surface 59 (FIG. 7) for holding the key in depressed or operated position. If a key 4 is locked in operated position and another key in the same bank is depressed, the consequent oscillation of the related latch 69 allows the initially depressed key to return up and locks the secondly depressed key in operated position. Manually and automatically operable hold-down latch actuators (which will be described later) are provided for oscillating all the latches 69 at the same time for simultaneously clearing all depressed keys 4. Depression of a zero key 4 serves only to actuate the related latch 69 for clearing its bank of keys.

Figure 9:
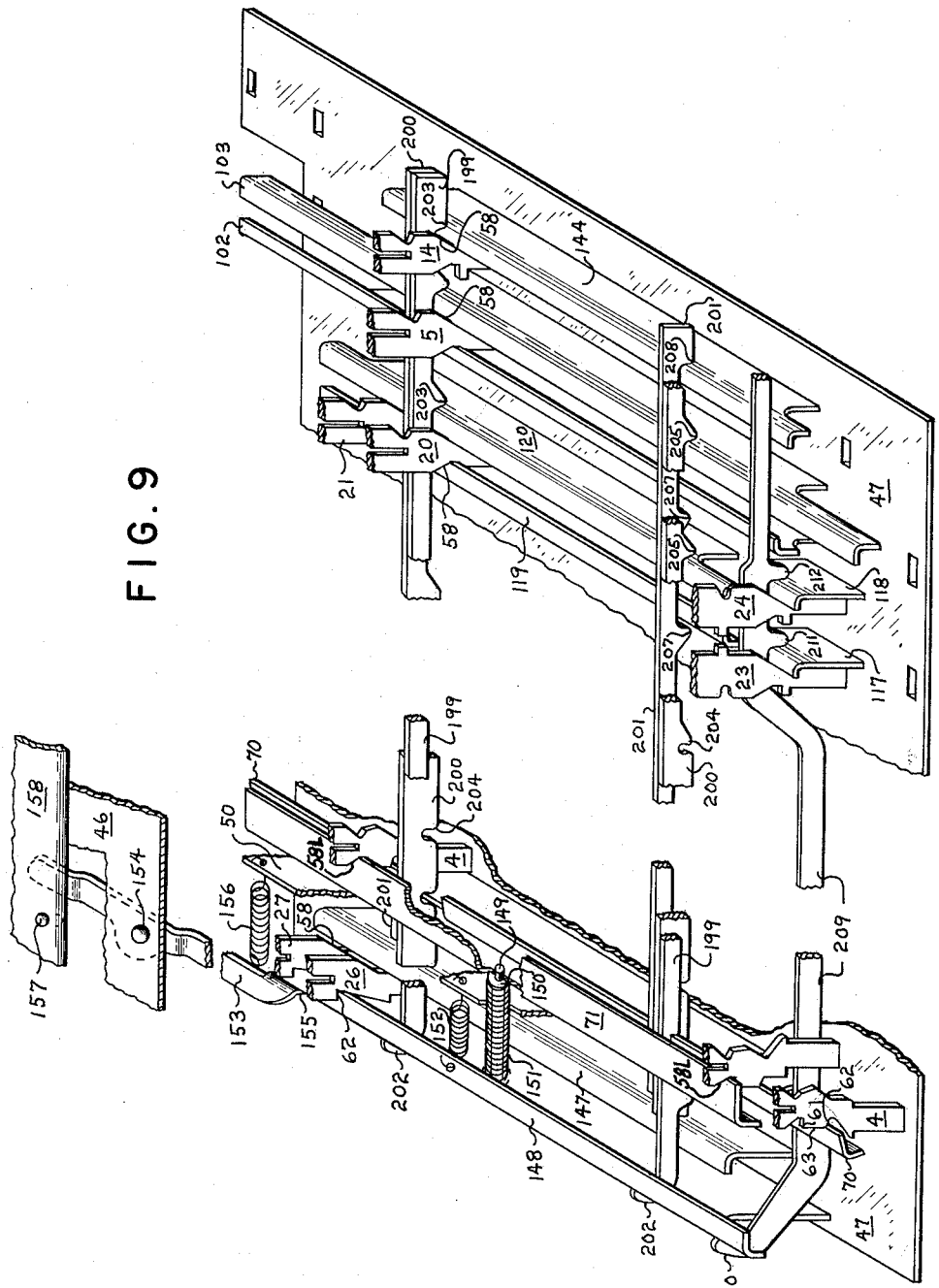
FIG. 9 is a condensed fragmentary perspective view of the inter-bank key locking devices and showing the carriage operated divide key lock.

A lock vane 70, FIG. 9, leftward of each bank of keys 4 and extending therealong, is fulcrumed on plate 47. Vanes 70, a part of the inter-bank locking device which will be described more fully later, are normally in a canted position, away from the key shanks, and are rocked clockwise toward the shanks of the related keys 4 in response to depression of any cycling key. The flange on each vane 70 extends toward the shanks of its related bank of keys, and in their operated clockwise positions, vanes 70 overlie latch-down shoulder 61 of all keys 4 that are in depressed position and underlie latch-up shoulder 62 of all keys 4 that are in normal or up position. Thus, while a cycling key is in depressed position, keys 4 are locked in their then current positions, and changing of a factor during computation operations of the machine is not possible. If a key 4 is partially depressed, its blocking edge 63 stands in the path of clockwise movement of the related vane 70, whereby, as will be described, none of the cycling keys can be depressed sufficiently to initiate operations of the machine. The left edge incline 58L of each key shank is significant only on the keys for values 1 to 9, inclusive, of the highest or tenth order bank. Vane 71, fulcrumed on plate 47 leftward of the tenth bank of key shanks has its flange extending to the shanks at about the origin of left inclines 58L. The relation between the vane flange and the inclines is such that on depression of any key for values 1 to 9, vane 71 is rocked counter-clockwise. This movement of vane 71, as will be described, effects an unlatching operation on the normally locked divide cycling keys. Thus when a real digit 1 to 9 is entered on the tenth bank of keys 4, the divide keys are free, in this respect, for depression.

3. *Locks of Multiplier Keys*

Depression of any multiplier key 5 (FIG. 1) values 1 to 9 indicates a cycle of multiplying operations according to the value of the key operated, and each depression of zero key 5 initiates an ordinal shift of the carriage in a preselected direction.

Figure 11:
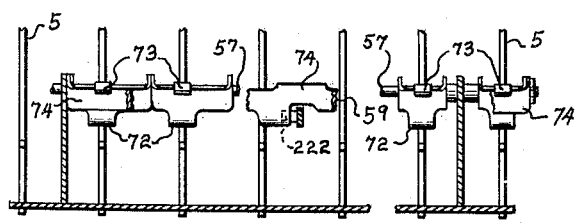
FIG. 11 is a condensed fragmentary sectional elevational right side view of the latch-down means for the multiplier keys shown in FIGURE 1.

For each key 5 for values 1 to 9 inclusive, a holddown latch 72 (FIG. 11) is pivotally mounted on rod 57, and is spring influenced against the right edge incline of its related key shank so that when the key is depressed, its latch 72 oscillates, engaging shoulder 59 in the same manner as shown in FIG. 7, thereby to hold the key in depressed position. A finger 73 (FIG. 11) carried on each latch 72 overlies bail 74, which is pivotally mounted on rod 57, so that upon turning movement of the bail in a generally upward direction, the bail rocks all of the latches 72 away from the key shanks. Thus, latch 72 of a depressed key 5 is disengaged from shoulder 59, FIG. 6, whereupon the key is spring returned to its up position. At about the time that a multiplying cycle of operations is being completed, bail 74 (FIG. 11) is turned, as will be described, to effect release of a depressed key 5.

Figure 12:
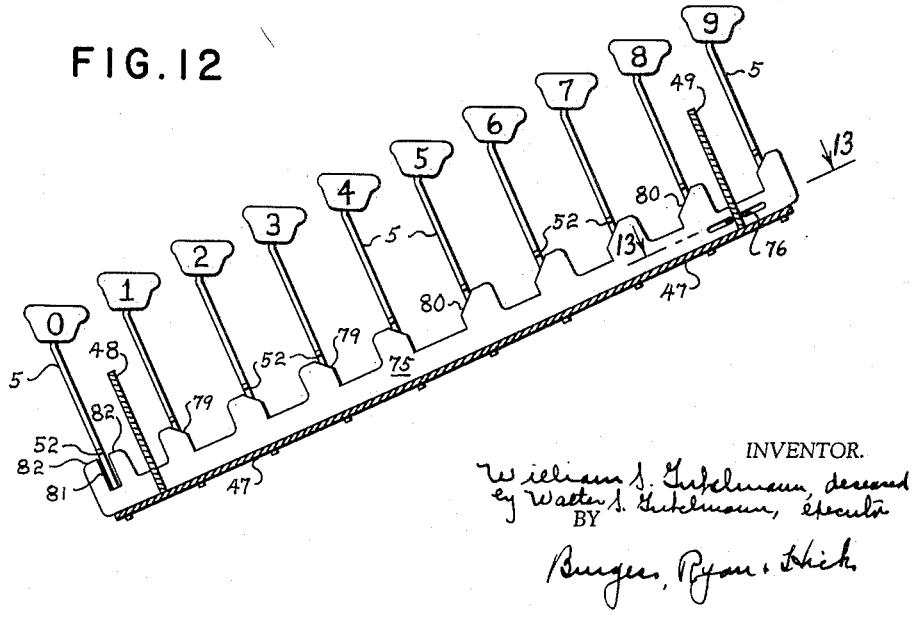
FIG. 12 is a sectional elevational right side view of the multiplier keys of FIGURE 1, taken substantially on plane 12—12 of FIGURE 1, and showing principally the slide bar for preventing operation of several of the keys simultaneously with another.

Slide lock member 75, FIG. 12, slidably supported on plate 47 right adjacent all keys 5 and slidably guided in suitable slots therefor on plates 48 and 49, is provided for blocking initiation of a shift operation by zero key 5 simultaneously with initiation of a multiplying operation by any key 5 for values one to nine, and for blocking starting of one operation, i.e., a shift or multiplying operation, while the other is in progress. In the machine embodying the invention, multiplicand selected predetermined product representations are set up in accordance with the multiplier value at a sensing position upon movement from a neutral position in one direction for values one to four and in the opposite direction for values five to nine. Accordingly, lock member 75 also blocks depression of any key 5 for values one to four with any key 5 for values five to nine, thereby to prevent conflicting product set-up operations.

Lock member 75 is slidable forwardly and rearwardly, and is normally held in neutral position by torsion centralizing spring 76 (FIG. 13) which is supported on plate 49 in proximity to member 75. The leads of spring 76 extend through slot 77 on member 75 and opposingly embrace the plate 49 and web 78, intermediate the ends of slot 77.

The upper edge or profile of member 75 (FIG. 12) is formed with inclines or bevels 79, one for each key 5 for values one to four, and bevels 80, one for each key 5 for values five to nine, and with slot 81 for zero key 5. In the neutral position of member 75, bevels 79 and 80 stand in the path of downward movement of shoulder formation 52 on the related key shank and slot 81 allows zero key 5 to move downward freely. Bevels 79 are so formed that on depression of any one to four value key 5, lock member 75 is slid forwardly, and bevels 80 are such that one depression of any five to nine value key 5, lock member 75 is slid rearwardly. Hence, depression of a one to four value key 5 simultaneously with a five to nine value key 5 is blocked by the then opposingly urged lock member 75.

On depression of zero key 5, its right shoulder 52 enters slot 81 on member 75, thereby to block endwise movement of the member in either direction, whereby member 75 blocks depression of all other keys 5. Endwise movement of member 75 by any 1 to 9 value key 5 displaces its slot 81 with respect to zero key 5 so that stop face 82 stands in the path of downward movement of the zero key shoulder 52 for blocking depression of the key.

Figure 14:
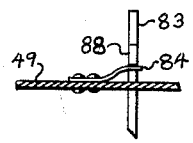
FIG. 14 is a sectional plan view taken substantially on plane 14—14 of FIGURE 15 and showing the slide operating spring in FIGURE 15.
Figure 15:
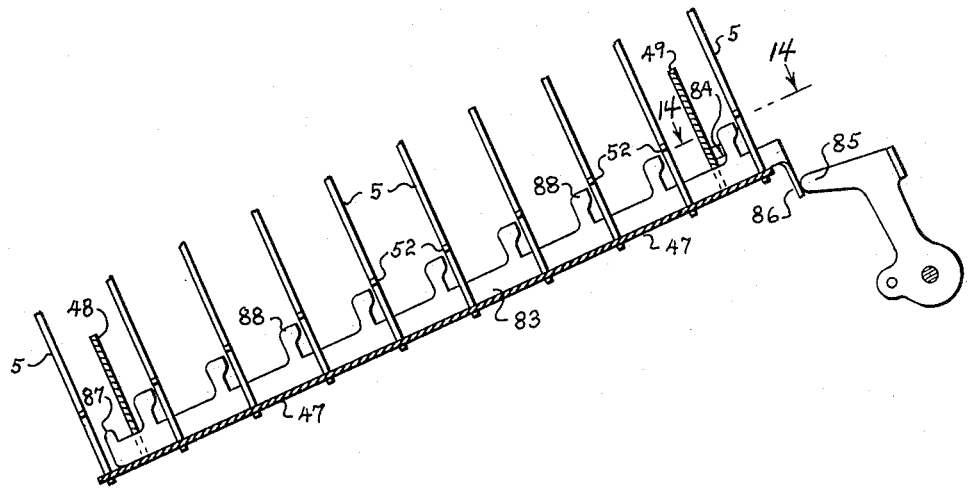
FIG. 15 is a fragmentary right side sectional elevational view of the multiplier keys of FIGURE 1, taken substantially on plane 12—12 of FIGURE 1 but with plate 75 of FIGURE 12 removed, and showing the key blocking slide means for preventing operation of a key when another is operated and a multiplying operation is in progress.

Slide lock member 83 (FIG. 15) left adjacent the shanks of keys 5 is provided for blocking depression of any of the one to nine value keys 5 until the cycle of multiplying operations initiated by a firstly depressed key 5 has progressed to a predetermined extent. Slide member 83, slidably supported on plate 47 and slidably guided in suitable slots on plates 48 and 49, is spring urged rearwardly by a leaf type spring 84 (see also FIG. 14) which is fastened to plate 49 and is tensioned against slide member 83. Member 83 (FIG. 15) is held in its rest or forward position, against the tension of its spring 84, by rockable lever 85 which acts on depending lug 86 on member 83. Lever 85 is turned clockwise at the start of each multiplying cycle of operations, as will be described, for allowing spring tensioned member 83 to move rearwardly until upright integral lug 87 contacts frame plate 48. For each of the one to nine value multiplier keys 5, member 83 carries an inverted generally L-shaped lug 88, each of which in the operated or rearward position of the member underlies shoulder formation 52 of its related key, if the key is not depressed, and each lug 88 passes freely over the shoulder formation of its related key, if it is depressed or operated. Thus member 83 blocks depression of any 1 to 9 value key 5 not depressed until lever 85 is rocked counter-clockwise to return member 83 to its forward position.

Figure 16:
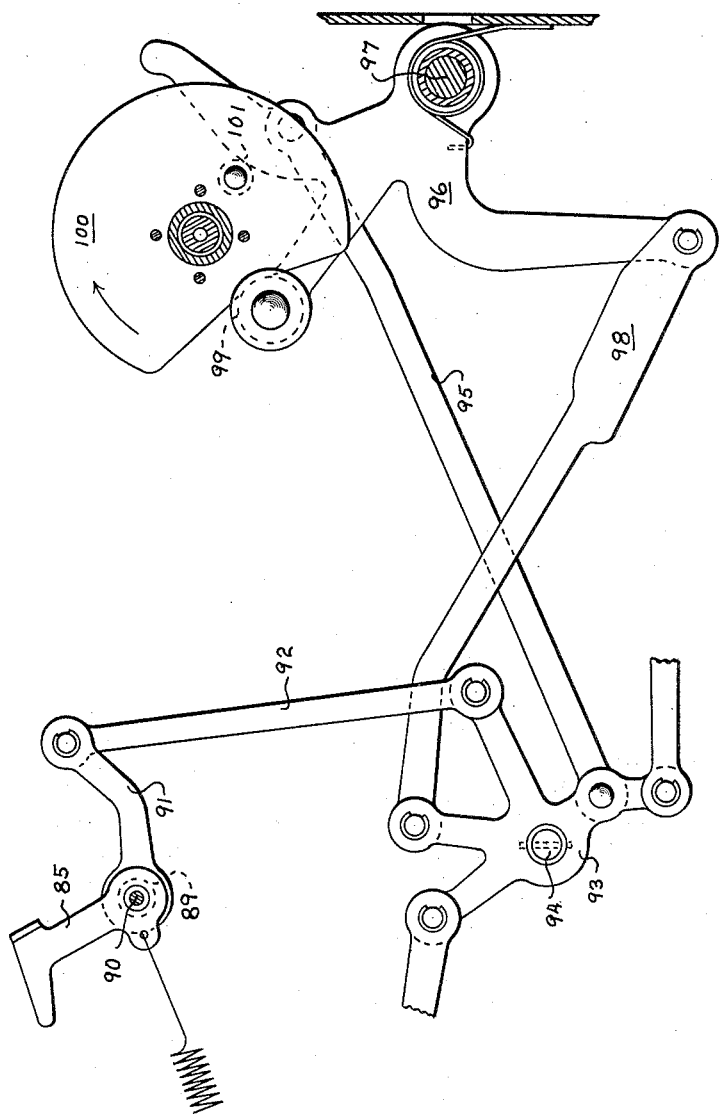
FIG. 16 is a fragmentary right side sectional elevation of power operated control means for the slide means of FIGURE 15.

Lever 85 (FIG. 16) is secured to one end of sleeve 89 which is turnably mounted on shaft 90 supported on the machine frame. Secured to the other end of sleeve 89 is a lever 91 which is connected by link 92 to an arm of multi-arm member 93, secured to shaft 94 journaled on the machine frame. A generally depending arm of member 93 is connected by link 95 to a generally upright arm of cam follower 96 pivoted on shaft 97, and a generally depending arm of the cam follower is connected by link 98 to a generally upright arm of member 93. Cam follower 96 carries a roller 99 which overlies the periphery of cam 100 of the multiplying power unit. Upon depression of a one to nine value multiplier key, the multiplying power unit turns clockwise one revolution and in the initial phase of the cycle, cam 100 rocks follower 96 counter-clockwise and holds the follower in its operated position until the latter phase of the cycle, during which roller 101 carried by the cam engages a generally upright arm of follower 96, then standing in its path, and rocks the cam follower clockwise to rest position, as illustrated. The arrangement is such that through the linkage parts 98, 95, 93, 92, 91 and 89, lever 85 is first rocked clockwise to allow locking of a depressed key 5 and then counter-clockwise to effect unlocking of such a key at a predetermined part of the cycle.

Vanes 102 (FIG. 9) and 103, fulcrumed on plate 47 respectively to the left and right of all the multiplier keys 5, are part of the inter-bank locking device for blocking (1) depression of a multiplier key with a cycling key in other banks; (2) depression of a multiplier key with certain clearing keys; (3) change of the multiplicand factor on keys 4 while a multiplication cycle is in progress, and (4) depression of a multiplier key while any one of the keys 4 is only partially depressed.

The flanges of vanes 102 and 103 extend toward the key shanks, at or about the origin of the respective inclines 58. The arrangement is such that when a multiplier key is depressed, its inclines rock the vanes outwardly of the shank and prevent the vanes from being returned to their normal vertical position while the key 5 is in depressed position. The outward movement of the vanes, as will be described, causes the cycling keys and certain clearing keys in the other banks to be locked against depression. When any of the certain clearing keys or any of the cycling keys in the other banks is depressed, one of the vanes, either 102 or 103, is blocked against outward movement, whereby multiplier keys 5 are locked against depression.

4. *Locks for Third Bank of Keys*

Figure 17:
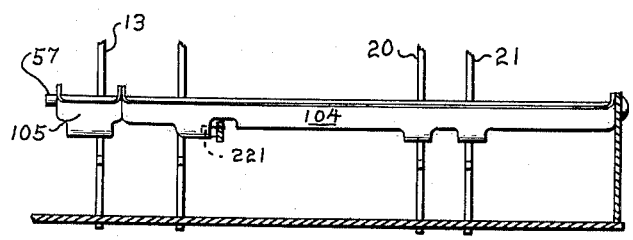
FIG. 17 is a fragmentary right side sectional elevational view taken substantially on plane 17—17 of FIGURE 1 and showing the plus key and minus key latch-down means, and the individual latch-down means for the carriage return key.

The third bank comprises the following keys (FIG. 1): Cycling keys: carriage return 13, add 20 and subtract 21; clearing keys: middle dial 23, top dial 24, and keyboard 25; and non-entry key 22. Hold down latch 104 (FIG. 17) for keys 20 and 21, and hold-down latch 105 for key 13 are pivotally mounted on rod 57, and are spring urged against the right edge incline of the related key shank, as explained, so that depression of key 13, 20 or 21, oscillates its related hold-down latch to engage latch-down surface 59, similarly as illustrated in FIG. 7, the operated cycling key is blocked in depressed position, until the related one of the hold-down latches 104 or 105 (FIG. 17) is oscillated automatically during the final phase of the cycle of operations initiated by the depressed key. The means for operating hold-down latches 104 and 105 for releasing the depressed key will be described later.

Figure 13:
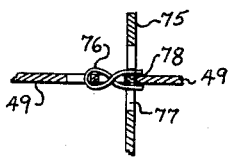
FIG. 13 is a sectional plan view taken substantially on plane 13—13 of FIGURE 12 and showing the spring centralizer means for the slide bar of FIGURE 12.
Figure 18:
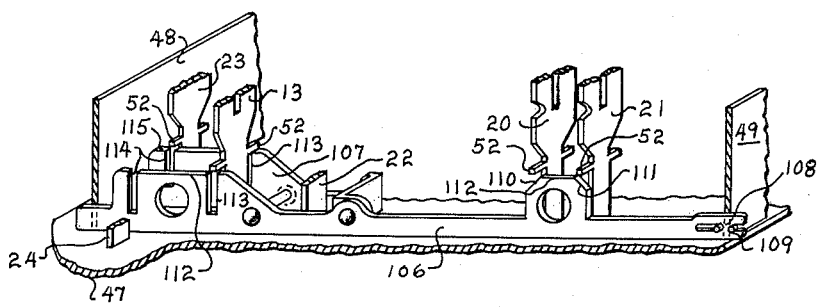
FIG. 18 is a fragmentary perspective view of a slide bar lock means for the plus and minus key bank shown in FIGURE 1.

Slide lock bar 106 (FIG. 18) is slidably supported on plate 47 and guided in suitable slots on plates 48 and 49 so as to situate right adjacent to keys 13, 20, 21 and 22 and left adjacent to key 24. Lock bar 106 has secured thereto for movement therewith lock bar 107 which is offset so as to extend parallelly with the forward portion of bar 106 and situate left adjacent keys 13 and 22 and right adjacent key 23. The rearward end of bar 106 is furcated with a connecting web 108 between the furcations. A torsion type centralizing spring 109, similar to spring 76 in FIG. 13, is so mounted on plate 49 to one side of bar 106 (FIG. 18) that its leads opposingly embrace the plate and web 108 for normally holding bar 106 in the illustrated neutral position.

The upper edge of bar 106 is formed with spaced inclines or camming surfaces 110 and 111 which, in the neutral position of the bar, lie in the path of downward movement of add key 20 and subtract key 21 respectively. The arrangement is such that when key 20 is depressed, its shoulder formation 52 acts on incline 110 to slide the bars 106 and 107 rearwardly against the tension of its return spring 109, and that when key 21 is depressed, its shoulder 52 acts on incline 111 to slide the bars forwardly against return spring 109. Hence, simultaneous depression of keys 20 and 21 is blocked by bar 106 which at such times is being urged to slide in opposite directions. On movement of slide bar 106 in response to depression of one of the keys 20 or 21, the portion of the bar's upper edge 112, between the inclines, stands in the path of shoulder 52 of the other key to block depression thereof.

In neutral position of slide bars 106 and 107 companion slots 113 thereon are aligned with shoulder formations 52 on carriage return shift key 13, and slot 114 on each bar is aligned with shoulder 52 of the related dial clearing key, thereby to allow depression of keys 13, 23 and 24 individually or in any optional combination. Upon depression of any key 13, 23 and 24, its shoulder 52 enters the related slot whereby endwise movement of bars 106 and 107 is blocked. Hence bar 106 blocks depression of add key 20 and subtract key 21 while any of the three keys, return shift initiating key 13, dial clearing keys 23 and 24, is depressed. Slots 114 are so formed as to cooperate with the related shoulders 52 of keys 23 and 24 for limiting the extent of depression of the keys. Endwise movement of slide bars 106 and 107 in response to either key 20 or 21, displaces the slots 113 and 114 with respect to the related keys 13, 23 and 24, and portions of upper edge 112 on bar 106 and edge 115 on bar 107 stand in the path of the related shoulders 52 of these keys to block their depression while either key 20 or 21 is in depressed position. In the above described form of slide bars 106 and 107, the bars do not block depression of non-entry key 22, and the key in depressed position does not block endwise movement of the bars. Thus it is possible to depress key 22 with both the add key and the minus key for blocking entry of the item "1" in the multiplier register.

Figure 19:
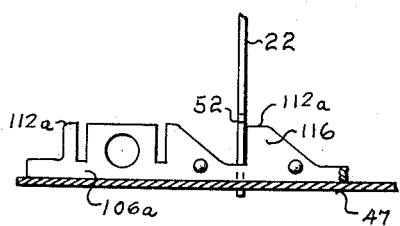
FIG. 19 is a fragmentary sectional elevational side view showing a modification of the slide bar of FIGURE 18.

A more restricted use of key 22 may be had as by modifying slide bar 106. One such preferred modified form is illustrated in FIG. 19, in which slide bar 106a carries a lug 116 for movement therewith. Lug 116 is so devised that on depression of key 22, its shoulder 52 blocks forward movement of bar 106a; therefore, subtract key 21 (FIG. 18) cannot be depressed. If subtract key 21 is depressed before key 22, bars 106a and 107 (FIG. 19) move forwardly, whereupon upper edge 112a of bar 106a stands in the path of shoulder 52 of key 22. Hence, in this modification, key 22 cannot be used with subtract key 21 to block entry of the item "1" in the multiplier register. However, the non-entry key 22 may be depressed with the add key 20 for preventing entry of the unit one in the multiplier-quotient register, as when entering a dividend in the machine.

Figure 20:
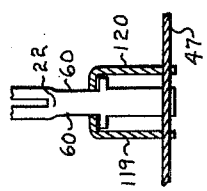
FIG. 20 is a fragmentary sectional elevational front view showing the non-entry key also shown in FIGURE 1, and showing inter-bank locking vanes on either side thereof.

Four vanes 117 (FIG. 9), 118, 119 and 120, parts of the inter-bank locking device, are fulcrumed on plate 47 in proximity to keys of the third bank as follows: vane 117 rightward of key 23 only; vane 118 rightward of key 24 only, and vanes 119 and 120 leftward and rightward respectively of keys 20 and 21, and of keys 13 and 22 which are not illustrated here for clarity. In normal or rest position, these vanes are generally vertical with their flanges extending to about the origin of the inclines 58 of the related keys, except of key 22 (FIG. 20) which, in one preferred form, does not have an incline on the edges relative to vanes 119 and 120. Referring to FIG. 9, the arrangement is such that on depression of any key 13, 20, 21, 23 and 24, the related vane or vanes, as the case may be, are rocked outwardly of the key shanks and are held in canted position until the depressed key is returned up. In canted position of vane 117 and 118, the computation cycling keys in other banks are locked against depression, and when any of such keys are in operated position, vanes 117 nad 118 are both blocked against movement from rest position whereby key 23 and 24 are locked against depression. In canted position of vanes 119 and 120, all cycling keys in the other banks are locked against depression, and upon operation of any of certain of such cycling keys vane 119 is locked in its normal position and upon operation of any of others of such cyling keys vane 120 is locked in its normal position, whereby keys 13, 20 and 21 are locked against depression.

The generally uniform edges 60 (FIG. 20) on the shank of non-entry key 22 do not act on vanes 119 and 120; therefore, key 22 may be depressed optionally with computation cycling keys of other banks, such as divide and multiplier keys, for blocking entry of quotients and multipliers.

Figure 22:
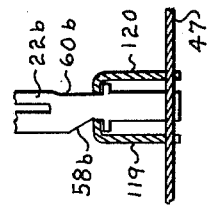
FIG 22 is an elevational view similar to FIGURE 20, but it illustrates another modification of the non-entry key of FIGURE 20.
Figure 21:
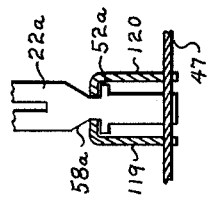
FIG. 21 is an elevational view similar to FIGURE 20 but illustrating one modification of the non-entry key of FIGURE 20.
Figure 23:
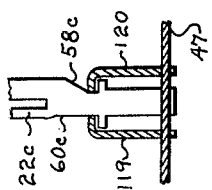
FIG. 23 is an elevational view similar to FIGURE 20 but it illustrates a third modified form of the non-entry key shown in FIGURE 20.

In FIG. 21 a modified form of non-entry key is illustrated. This key 22a is formed with an incline 58a on both edges upward from shoulder formation 52a for acting on both vanes 119 and 120. Hence, key 22a cannot be depressed with any shift, divide or multiplier keys. Another modification of the non-entry key is shown in FIG. 22. Key 22b is formed with an incline 58b on its left edge and with a generally uniform vertical right edge 60b. Key 22b acts on vane 119 and not on vane 120. In FIG. 23 another modification of the non-entry key is illustrated. Key 22c is formed with a straight vertical left edge 60c and with incline 58c on its right edge for cooperating with vane 120. Through vane 120, as will be described, depression of key 22c, with a multiplier key or a divide key is not possible. Hence, all multipliers and quotients are entered into the register therefor.

Figure 24:
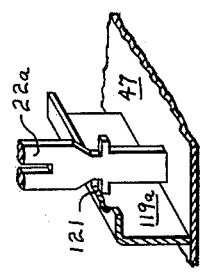
FIG. 24 is a fragmentary perspective view showing the modified form of the non-entry key of FIGURE 21 and a modified form of an associated vane.

Variously restricted usage of the non-entry key of, for example, the type shown in FIG. 21 may be obtained as by suitably notching the flange of vane 119 or vane 120 or of both vanes as illustrated in FIG. 24 at 121 on vane 119a. Hence, vane 119a is not rocked on depression of keys 22a, whereby the key is depressible optionally with a shift key.

Key 25 (FIG. 4), the foremost key of the bank, which is the keyboard clear key, is not provided with look-down means and does not cooperate with any of the vanes 117–120. Key 25 will be described later.

5. *Locks for Shift Keys*

The several locking means for the extreme shift initiating keys 14 (FIG. 4) and 15 and for the step-by-step shift initiating keys 16 and 17 will now be explained.

Hold-down latch member 122 (FIG. 25), pivotally mounted on rod 57, is provided for holding the operated one of the two extreme shift keys 14 and 15 (not illustrated here) in depressed position until the shift initiated thereby is completed. Member 122 is formed with two generally depending portions 123, one for each extreme shift key. A spring 64, similar to the one shown in FIG. 6, influences the latch 122 clockwise into contact with the right edge inclines 58 of the related keys. Thus, on depression of a related extreme shift key, its incline 58 effects oscillation of the latch so that the depending portion edge overlies latch-down surface 59, similarly as illustrated in FIG. 7, thereby to hold the key in depressed position. At the completion of the shift operation, latch member 122 (FIG. 25) is rocked counterclockwise automatically to allow the operated key to return to its up position.

Latch member 122 and hold-down latch 105 for the carriage return shift key 13 (FIG. 17) are connected to each other by hook 124 (FIG. 25) for counter-clockwise rocking of latch 105 together with latch 122; thus, the depressed one of the shift keys 13 (FIG. 4), 14 or 15 is released. Hook 124 (FIG. 25) is formed on its left end with lost motion slot 125 for slidable connection of the hook as at 126, with hold-down latch 105, and the right portion of hook 124 is received in slot 127 on latch 122, so that the hook formation on the right end of hook 124 is in contact with latch 122 to move rightward therewith when the member is turned counter-clockwise. The lost-motion connection between hook 124 and latch 105 is such that counter-clockwise turning of latch 122 in response to depression of key 14 or 15 may slide hook 124 rightward freely, without unnecessarily moving latch 105, and that on depression of key 13, stud or connection 126 may slide freely in slot 127 whereby member 122 is not rocked unnecessarily. However, when member 122 is rocked counter-clockwise an angular extent greater than that effected by depression of key 14 or 15, the lost motion allowance is taken up and latch 105 is then turned counter-clockwise. For the key-release counter-clockwise turning of member 122, its generally lateral integral lug 128 overlies the generally forwardly extending arm of bellcrank 129 which is pivotally mounted on plate 51. The depending arm of the bellcrank is connected by link 130 to the depending arm of bail member 131 pivoted on stud 132 on the machine frame. Bail 131 is formed with a pair of arms 133, one at each of its ends, extending forwardly parallelly so as to overlie the ends of transversely disposed rock member 134, which is pivotally mounted on bracket 135 secured to the machine frame. A generally upright portion of rock member 134 is bifurcated for embracing disc 136 secured to the right end of transverse shaft 137 of the tabulating mechanism, which shaft is slidably journalled on the machine frame. Torsion spring 138, tensioned between the frame and bail 131, influences the bail counter-clockwise, which through its parallel arms holds rock member 134 and shaft 137 normally in neutral position as shown. Shaft 137, as described in the parent application, is moved transversely a predetermined extent by the carriage each time the carriage moves to either extreme position, and also when the carriage moves in response to certain shift initiating keys to a preselected ordinal position. Through disc 136, axial movement of shaft 137 effects clockwise or counter-clockwise rocking of rock member 134, depending on the direction of shift of the carriage. Consequently, one or the other of the parallel bail arms 133 is elevated, i.e., bail member 131 is turned clockwise and through link 130 bellcrank 129 is also rocked clockwise to effect the key-release counter-clockwise turning of hold-down latches 122 and 105.

Figure 5:
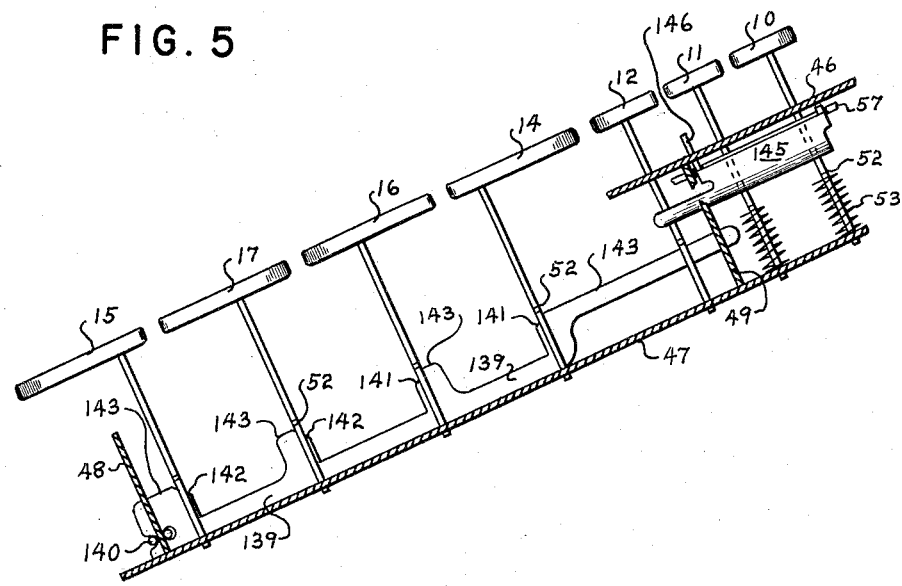
FIG. 5 is a fragmentary right side elevational view of the carriage shift keys and the automatic carriage direction set-up keys of FIGURE 1, taken substantially on plane 5—5 of FIGURE 1, and showing principally the slide bar for preventing simultaneous operation of opposing direction shift keys and the latch-down means for the direction set-up keys.

Slide bar 139, FIG. 5, situated under the left edge shoulder formation 52 of shift keys 14 to 17 inclusive, is slidably supported on plate 47 and guided in slots on plates 48 and 49. The leads of torsion type spring 140, supported on plate 48 are passed through suitable openings on the plate and bar (as illustrated of spring 76 in FIG. 13) so as to exert opposing forces on the plate 48 and a web portion on the bar 139, for normally holding bar 139 (FIG. 5) in neutral position. The upper edge of bar 139 is formed with two inclines 141, one for each left shift key 14 and 16, and two inclines 142, one for each right shift key 15 and 17. On depression of a left shift key, its shoulder formation 52 acts on an incline 141 to shift the bar 139 rearwardly, and a right shift key acts on an incline 142 to shift the bar forwardly. Thus, depression of a left shift key at the same time with a right shift key is blocked by oppositely urged bar 139. In either shift position of bar 139, two of the four stop faces 143 on its upper edge stand in the path of shoulder formation 52 of the two opposite direction shift keys, thereby to block them against depression.

Valve 144, FIG. 9, fulcrumed on plate 47 rightward of shift keys 14 to 17 inclusive, of which only key 14 is shown, is part of the inter-bank locking device for blocking depression of these keys with a cycling key of the other banks. The flange of vane 144 extends to the right edge of the key shanks at about the origin of incline or camming surface 58 on each. When any key 14 to 17 is depressed, its incline 58 rocks vane 144 clockwise and blocks return movement of the vane to its vertical or normal position. In canted or operated position, vane 144 effects locking of all cycling keys in other banks against depression, as will be described, and operation of any cycling key in the other banks blocks vane 144 against clockwise movement, whereby vane 144 locks shift keys 14 to 17 against depression.

A hold-down latch 145 (FIG. 5) for keys 10, 11 and 12 is pivotally mounted on rod 57, and is influenced by its torsion spring 64, as shown in FIG. 6, against the right edge incline of the key shanks. On depression of any of the keys, the latch oscillates to engage latch-surface 59 on the shank, similarly as shown in FIG. 7, for holding the key in depressed position. A relief surface 59a (FIG. 4) on each of the three keys, between latch-down surface 59 and incline 58, is provided so that the rightmost extent of the latch-down surface is less than the throw of the incline. Therefore, if one of the three keys 10–12 (FIG. 5) is locked in depressed position and another of the keys is depressed, the consequent oscillation of hold-down latch 145 disengages the latch from the latch-down surface of the initially depressed key, allowing that key to return up, and engages the latch-down surface of the secondly depressed key to lock that key in operated position. Latch 145 is formed with generally upright finger 146 which extends through a suitable slot on plate 46 for manual rocking of the latch for release of any locked-down key, as when it is desired to have all the keys 10, 11 and 12 in their up positions.

6. *Divide Key Locks*

In the machine embodying the invention, two divide keys 26 (FIG. 2) and 27 are provided for initiating division operations. With key 26 a 10-digit quotient is obtainable, and with key 27 a lesser predetermined number of quotient digits may be obtained provided that preselection of a tabulator key 18, corresponding to the number of digits desired, is made. Both divide keys are subject to locking devices for preventing their depression when an improper start is attempted. In this machine, as in long division procedure, a trial quotient is selected on comparison of the highest order of the divisor with the highest order of the dividend, or the highest two orders of the remainder, and is determined on comparison of multiples of the divisor with the highest orders of the dividend or remainder, as the case may be. Accordingly, at the outset the highest order of the dividend entered into register 3 may, at the most, align ordinally with, but never exceed, the highest order of the divisor appearing in register 6. Such a dividend-divisor relationship, in this machine, is obtained by shifting the carriage to its right extreme position and then entering the dividend in register 3, and setting up the divisor on keys 4, from left to right, with the highest order real digit (1 to 9) in the leftmost bank of keys 4. With the carriage so positioned, the highest order of the dividend will appear in a dial 8 of register 3, which corresponds ordinally to the tenth bank of keys 4. In order to assure that the proper ordinal dividend-divisor relationship exists, lock means are provided for blocking depression of the divide keys when the carriage is not in its rightmost position and a real divisor digit is not set-up on the highest order bank of keys 4. Provision is also made for blocking depression of a divide key with any other cycling key in other banks, or when a divisor factor key is partly depressed, and for preventing changing of the divisor factor during division cycling.

Referring to FIG. 9, vanes 147 and 148 are fulcrumed on plate 47 respectively to the right and left of the divide key shanks 26 and 27, with the flange of normally vertical vane 147 extending to the right edge of the shanks at about the origin of incline 58 on each, and with the flange of normally vertical vane 148 underlying each latch-up shoulder 62. Thus vane 148 blocks depression of the divide keys until it is moved counter-clockwise, out from under shoulder 62. When a divide key is depressed, its incline 58 rocks vane 147 clockwise and while the key is depressed its shank blocks the vane against returning to its vertical position. Vane 147, as will be described, in its clockwise or operated position effects locking of all factor keys 4 in their current positions, and, if any key 4 is only partially depressed, vane 147 is blocked against counter-clockwise movement whereby the divide keys are blocked against depression.

Vane 71 of the leftmost bank of keys 4, as previously described, is rocked to a counter-clockwise position when any key 4 for values one to nine is depressed. A rod 149, formed with a head on its left end, is slidably mounted on vanes 71 and 148 so that the rod may slide leftward ahead of vane 148, but that the rod head blocks the vane from rocking leftward ahead of the rod. Ring 150, mounted in an annular groove on the rod, is in contact with vane 71 so that leftward rocking of the vane slides the rod leftward. Coil spring 151 on the rod between ring 150 and vane 148, yieldably holds the vane against the rod head and serves, at times, to rock the vane counter-clockwise when the rod is moved leftward. If vane 148 is not free to turn counter-clockwise when a one to nine value key 4 in the leftmost bank is depressed, the rod merely slides leftward and compresses spring 151. Spring 152 is fastened to vane 148 and plate 50 for holding both vanes 148 and 71 in their normal vertical position as shown. Spring 152 is of lesser tension than spring 151.

Normally, the only time vane 148 may be moved counter-clockwise in response to operation of vane 71 is when the carriage is in its rightmost position. Lever 153, pivoted at 154 on the underside of keyboard frame plate 46, is formed with a depending lug 155 on its forward arm. Spring 156, of greater tension than spring 151 in its compressed state, is tensioned between lever 153 and plate 50 for influencing the lever 153 counter-clockwise with lug 155 against vane 148 for holding the vane in its vertical key blocking position. The rearward arm of lever 153 stands in the path of rightward movement of stud 157 on carriage cover plate 158. The relationship between stud 157 and the lever is such that when the carriage shifts to its rightmost position, the stud turns the lever clockwise, out of the path of vane 148. Then, and only then, the vane 148 is free to rock counter-clockwise in response to depression of a real digit key 4 in the tenth bank. Vane 148 is also a part of the inter-bank locking device for blocking depression of a divide key with other cycling keys and certain clearing keys, as will be described.

Figure 26:
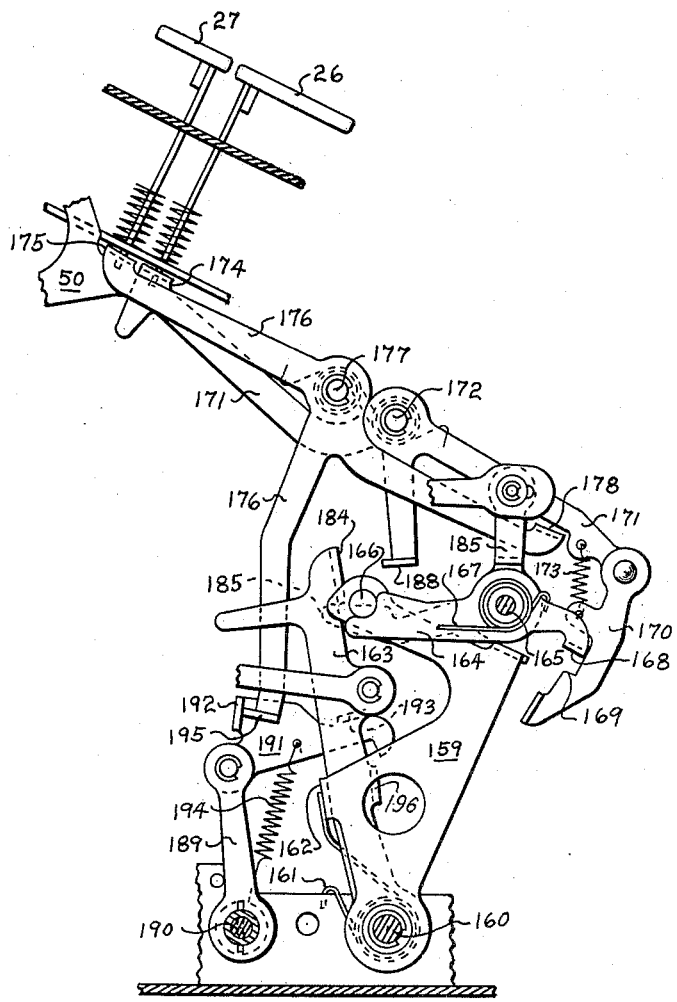
FIG. 26 is a fragmentary sectional left side elevation taken substantially on plane 26—26 of FIGURE 1, and showing the divide keys of FIGURE 1, and the related latch-down and division conditioning mechanism.

Depression of either divide key 26 or 27 triggers a mechanism which operates to condition the machine for division and initiate the division process, as described in the parent application, and locks the divide key in operated position, as will now be described. Generally upright actuating member 159 (FIG. 26) of the conditioning mechanism is pivotally mounted on shaft 160 which is fixed on the machine frame. A torsion spring 161 is tensioned between the machine frame and lateral lug 162 of member 159 for turning member 159 clockwise. Lever 163, pivoted on shaft 160 adjacent to member 159, is normally in contact with lug 162 so as to be turned clockwise together with member 159. Actuation of lever 163 effects the conditioning, initiating and locking operations.

Spring tensioned member 159 is held cocked in normal position by detent 164 which is pivoted on shaft 165 fixed on the machine frame. Roller 166 on member 159 contacts the end of the rearward arm of the detent. Torsion spring 167, fastened to detent 164 and the machine frame, influences the detent clockwise. A portion of the rearward detent arm underlies roller 166 so as to block the detent from turning clockwise out of engagement from the roller. In order to trigger or release member 159, detent 164 is rocked counter-clockwise consequent to depression of a divide key. For this purpose, lateral lug 168 on the forward arm of the detent 164 stands in the path of upward movement of shoulder 169 on depending hook means 170 pivoted on the forward arm of lever 171 which is fulcrumed on stud 172 on frame plate 50. Spring 173, tensioned between hook 170 and lever 171, influences the hook clockwise against the lug 168 so that on upward movement of the hook, shoulder 169 engages lug 168 and turns detent 164 counter-clockwise. The rearward arm of lever 171 is formed with a lateral lug 174 which is received in a suitable recess therefor on the left edge of the shank of divide key 26, so that the lever and key move together. Thus depression of divide key 26, rocks lever 171 counter-clockwise for elevating hook 170. The shank of divide tabulation key 27 is also formed similarly with a recess for receiving lateral lug 175 on the rearward arm of lever 176 which is pivoted on stud 177 on frame 50. A lateral lug 178 on the forward arm of lever 176 underlies the forward arm of lever 171 so that counter-clockwise turning of lever 176, consequent depression of key 27, turns lever 171 for elevating hook 170. The arrangement is such that depression of either divide key 26 or 27 elevates hook 170 sufficiently to cause detent 164 to disengage from roller 166 only after the selected divide key has been depressed sufficiently to render the interbank lock device effective for blocking depression of other cycling keys and of certain clearing keys, and to lock the factor keys against loss or change of the divisor.

Figure 27:
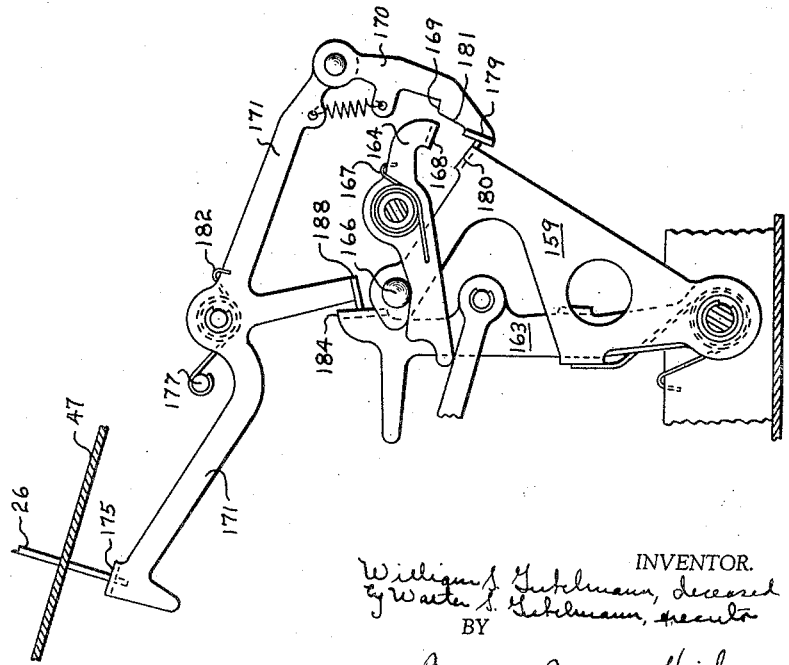
FIG. 27 is a fragmentary side elevation showing the divide keys and related mechanism of FIGURE 26, all in operated position.

When triggered, spring driven member 159 turns clockwise against a positive stop (not illustrated) and is returned automatically counter-clockwise to cocked position again during the key-instituted revolution of the division power unit, as disclosed in the parent application. Lever 171 and hook 170 are returned to their normal positions when a solution has been reached. Elevated hook 170 (FIG. 27) is disengaged from detent 164 on the clockwise or forward stroke of member 159 in order to render the detent effective again for holding member 159 in cocked position when the member is returned.

In elevated position of hook 170, integral lug 179 stands in the path of forward movement of lug 180 on member 159, so that toward the end of the clockwise stroke of member 159, lug 180 will swing hook 170 counter-clockwise to unlatch shoulder 169 from lug 168 of detent 164. In operated position, detent 164 is not in contact with roller 166. However, when hook 170 is unlatched from the detent, the aforementioned spring 167 turns the detent clockwise against roller 166, and in this position of detent 164, its lug 168 is displaced downwardly with respect to shoulder 169 with the vertical edge 181 of spring influenced hook 170 in position for contacting lug 168. Thus hook 170 cannot relatch with detent 164 while member 159 is being returned to normal position.

Figure 28:
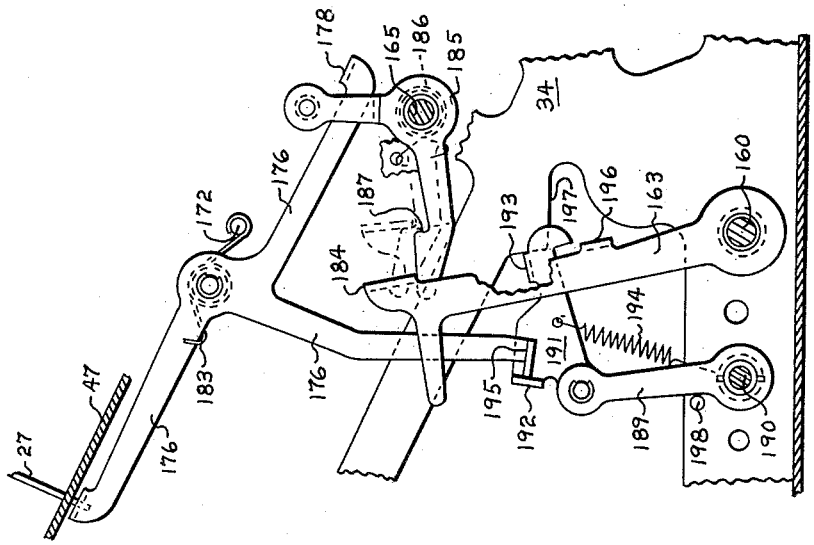
FIG. 28 is a fragmentary left side elevation showing the divide tabulation key and related mechanism of FIGURE 26.

Lever 171 is held in operated position, as will be described, until a solution is reached. Then lever 171 is returned clockwise to normal position by torsion spring 182, tensioned between the lever and stud 177, and hook 170 carried by the lever is lowered again to effective position for engaging lug 168 as previously set forth. Lever 176 (FIG. 28) is also held in operated position, as will be described, during division initiated by key 27, and when a solution is reached, lever 176 is returned clockwise to normal position by torsion spring 183 tensioned between the lever and stud 172. The normal positions of levers 171 (FIG. 26) and 176 are determined by the related divide keys 26 and 27 in their up positions.

Lateral lug 184 on the free end of lever 163 overlies latch member 185 (FIG. 28) which is pivoted on shaft 165 and is influenced clockwise by torsion spring 186 fastened thereto and to the machine frame. Latch 185 is formed with a step face 187 for latching lug 184 when lever 163 is turned forwardly to operated position, as shown in phantom, whereby latch 185 blocks spring influenced lever 163 from returning counter-clockwise when member 159 (FIG. 26) is recocked. Lever 163 is spring returned, as disclosed in the parent application, to normal position against lug 162 of recocked member 159 when latch 185 (FIG. 28) is rocked counter-clockwise to disengage its face 187 from lug 184. This occurs only when a solution has been reached.

Key 26 (FIG. 26) is held in depressed position by lever 163 during division operations instituted by either that key or key 27. Key actuated lever 171 is provided with a depending arm formed with lateral lug 188 which lies in the path of clockwise movement of lug 184 on lever 163. The relationship between the two lugs, 184 and 188, is such that in the operated positions of levers 163 and 171, FIG. 27, lug 184 is in contact with lug 188 so as to hold lever 171 and key 26 coupled therewith in operated position until lever 163 is released to return to normal position.

A generally upright lever 189 (FIG. 26) is secured to transverse shaft 190, journaled on the machine frame. The free end of lever 189 has swiveled thereon a forwardly extending hook 191 which is formed with two lateral lugs, generally vertical lug 192 and generally horizontal lug 193. Hook 191 is influenced clockwise by spring 194 fastened thereto and to shaft 190. In normal position of key operated lever 176, FIG. 28, lug 195 on depending arm of the lever is in contact with vertical lug 192 so as to hold the hook 191 counter-clockwise, against the tension of spring 194 and disengaged from lug 196 on lever 163. Depression of key 27 rocks lever 176 counter-clockwise, whereupon lug 195 moves forward of the lug 192 sufficiently to permit hook 191 to latch onto lug 196 of lever 163 before lever 176 actuates lever 171, FIG. 26, there being lost motion provided therefor between lug 178 and lever 171. Then, when member 159 is triggered to turn clockwise, as set forth, lever 163 and the coupled hook 191 are pulled forwardly, and consequently spring tensioned lever 189 and shaft 190 are turned clockwise to render the tabulation mechanism effective to cause termination of division operations when a predetermined number of quotient digits are obtained according to a pre-set tabulator key, as described in the parent application.

The relationship between hook 191 (FIG. 28) and lever 176 is such that during the final phase of the hook's forward stroke, its lug 192 contacts lug 195 of the lever. In the initial phase of the hook's stroke and before lugs 192 and 195 contact each other, horizontal lug 193, which is formed to extend through a suitable opening on the adjacent frame plate 34, moves under surface 197 on the plate. Thus hook 191 is blocked from rocking counter-clockwise when lug 192 contacts lug 195, whereby hook 191 holds lever 176 and key 27 coupled therewith in operated position until a solution is reached. Then lever 163 returns counter-clockwise, allowing lever 189 to be spring returned, as described in the parent application, against fixed stud 198 on frame 34. On the rearward stroke of lever 189, hook 191 is moved rearward to rest position, as illustrated, allowing lever 176 and key 27 to return to their normal positions.

7. Inter-Bank Locking Device

Referring to FIG. 9, vanes 71, 102, 103, 117, 118, 119, 120, 144, 147 and 148 of the inter-bank device, have been described hereinbefore with respect to the cooperation of each vane with its bank related keys. Several transverse members are provided, as will now be described, for cooperating variously with different ones of the vanes for rendering others of the vanes effective for locking the related keys, so that a cycling key in one bank cannot be depressed with a cycling and/or certain clearing keys in other banks.

Two groups of three transverse bars 199, 200 and 201, in each group, are slidably mounted on the keyboard frame. The two groups of bars are spaced apart parallelly for more uniform control of the elongated vanes. Each bar of one group is identical to its companion bar of the other group, and the description of one of each pair of bars will also describe the other bar of the particular pair.

The left portion of bar 199 is passed through suitable slots on vanes 71 and 148 for moving freely therein, and the other portions of the bar extend over all the other vanes. On its left end, bar 199 is formed with an upturn 202 which situates left adjacent to vane 148 for at times to be slid leftward by the vane and for at times to rock the vane from canted position back to its illustrated vertical position. The rightward portion of bar 199 is formed with depending fingers 203, one for each of the vanes 103, 120 and 144 and situated right adjacent thereto, so that on clockwise turning of any of these vanes it engages the related finger 203 and slides the bar 199 rightwardly. It will be recalled that when a divide key 26 or 27 is depressable, vane 148 is yieldably held in canted position, counter-clockwise from the illustrated vertical position. Accordingly, bar 199 is moved leftward by vane 148 and depending fingers 203 contact vanes 103, 120 and 144, then in their illustrated vertical positions. If a divide key 26 or 27 is depressed, vane 148 is blocked from turning clockwise, as described, and the vane prevents bar 199 from sliding rightward whereby the bar blocks vanes 103, 120 and 144 from turning clockwise. Hence, the add, subtract, certain modifications of non-entry and carriage return keys 20, 21, (22a and 22c) and 13 respectively, controlled by vane 120, the multiplier keys 5 controlled by vane 103, and shift keys 14, 15, 16 and 17, controlled by vane 144 are blocked against depression. If, instead, one of the keys associated with one of the vanes 103, 120 and 144 is depressed, the related vane turns clockwise, moving bar 199 rightward and therethrough the yieldably held canted vane 148 is turned clockwise to vertical position, whereat it locks the divide keys 26 and 27 against depression as described.

Bar 200 is formed on its depending edge with a plurality of socket type notches 204, one for each of the vanes 70, the flanges of which are suitably notched for coupling of the vanes with the bar for movement therewith, and the rightward portion of the bar is formed with depending fingers 205 which situate right adjacent vanes 103 and 120. A leaf type spring 206 (FIG. 29) fastened to plate 47 and tensioned against one of the vanes 70 for holding that vane in its normal canted position away from the shanks of the related keys 4 (not shown), and for therethrough holding bar 200 in leftward position whereat the left end of the bar is in contact with the right face of vane 147 in upright position, and integral depending fingers 205 (FIG. 9) are in contact with their respective vanes 103 and 120; and through bar 200, the spring 206 serves to hold all other vanes 70 in canted position. It will be recalled that in response to depression of any of the computation cycling keys, the related one of the vanes, 103, 120 and 147, rocks clockwise. Such movement of any of these vanes shifts bar 200 rightward so as to rock all vanes 70 from canted to vertical position whereat, as described, vanes 70 lock the related keys 4 in their then current depressed or up positions. Thus, the factor setup by keys 4 cannot be changed while a computation cycling key, such as 5 (FIG. 1), 20, 21, 26 or 27 is in depressed position. If a key 4 is partially depressed, the related vane 70 (FIG. 9) is blocked as described, from turning clockwise. Hence, bar 200 cannot shift rightward, which then prevents vanes 103, 120 and 147 from rocking clockwise, whereby the vanes 103, 120 and 147 block depression of the related computation cycling keys.

Bar 201 is formed with depending fingers 207, one for each vane 102 and 119 and situated left adjacent the related vane, and with depending shoulder 208 situated right adjacent vane 144. The arrangement is such that when either vane 102 or 119 is rocked counter-clockwise in response to depression of a related cycling key the operated vane contacts the related finger 207 and holds bar 201 in its leftmost position whereat integral shoulder 208 contacts vane 114 for preventing clockwise turning of vane 144 from its upright position, whereby, as described, vane 144 prevents depression of any of the related shift cycling keys. Also, when vane 144 is turned clockwise, consequent on depression of any of the related shift cycling keys, the vane contacts shoulder 208 on bar 201 and holds the bar in a rightward position whereat integral fingers 207 are against vanes 102 and 119 for preventing counter-clockwise turning of the vanes 102 and 119 from their upright positions, whereby vane 102 blocks depression of any key 5 and vane 119 blocks depression of add, subtract and carriage return keys 20, 21, and 13 respectively, and of modified keys 22a (FIG. 21) and 22b, FIG. 22.

A transverse bar 209, FIG. 9, slidably mounted on the keyboard frame, extends under the forward extension of vane 148 and is formed with upturn 210 which situates left adjacent to the vane. On its rightward portion bar 209 is formed with two depending fingers 211, 212 of which finger 211 situates right adjacent vane 117 and finger 212 situates intermediate vanes 102 and 118, i.e., right adjacent to vane 118 and left adjacent to vane 102. The arrangement is such that when vane 148 is held in canted position, consequent on depression of a divide key 26 or 27, vane 148 is in contact with upturn 210 for holding bar 209 in a leftward position whereat its integral fingers 211 and 212 contact vanes 117 and 118 respectively for locking the vanes in their upright position, whereby dial clearing keys 23 and 24 cannot be depressed. If, however, one of the clearing keys 23 or 24 is depressed, the respectively related vane 117 or 118 turns clockwise to contact the related finger 211 or 212 for holding bar 209 in a rightward position whereat upturn 210 is against vane 148 then in its upright position for blocking movement of the vane therefrom. Thus, as described, the upright vane 148 blocks depression of the divide keys 26 or 27 during register clearing operations. The relation between vanes 102, 117 and 118 and fingers 211 and 212 is such that when a vane 117 or 118 is turned clockwise to canted position in response to depression of its related key 23 or 24, the operated vane contacts the related finger 211 or 212 respectively for holding bar 209 in a rightward position whereat finger 212 is against vane 102 for blocking counter-clockwise turning of vane 102, whereby multiplier keys 5 are blocked against depression. Also, when a multiplier key 5 is in depressed position, vane 102 is canted counter-clockwise against finger 212 for holding bar 209 in a leftward position whereat fingers 211 and 212 block clockwise turning respectively of vanes 117 and 118. Therefore dial clearing keys 23 and 24 are not depressable, as described, during multiplying operations.

Two spaced transversely disposed identical means are provided for cooperating with vanes 102 and 120, and the description of one will also describe the other. A slide member 213 (FIG. 30) is slidably supported at its end portions in suitable slots on vanes 102, 120 and a block member 214 is secured to slide member 213 so that its ends are adjacent the vanes and form contact faces therefor. The arrangement is such that when one of the two vanes 102 and 120 is turned to canted position in response to depression of a related key, the operated or canted vane is in contact with block member 214 and holds the member against the other of the two vanes for blocking turning of that vane to canted position whereby the keys related thereto cannot be depressed. Therefore a multiplier key 5 under control of vane 102 cannot be depressed with carriage return, add and subtract keys 13, 20 and 21 (and the modified keys 22a, FIG. 21, and 22c, FIG. 23) under the control of vane 120. Carriage return key 13, and the other keys 20, 21 and the modified keys 22a and 22c are not shown here.

8. *Preventing Manual and Automatic Clearing*

Means are provided for (1) automatically unlatching a locked-down multiplier key 5 (FIG. 4) values one to nine, add key 20 or subtract key 21 at the end of the operations initiated thereby, (2) automatically clearing all depressed factor keys 4 at the end of operations started either by key 20 or 21, (3) manually clearing all depressed keys 4, and (4) for variously controlling the automatically and manually operated means for clearing keys 4, whereby a set-up factor can be retained as a constant factor and/or manual clearing thereof can be prevented.

Transverse bar 215 (FIG. 31) is slidably mounted on side frame members 50 and 51, and is formed with a plurality of upright ears 216, one for each rockable hold-down latch 69 for factor keys 4 (FIG. 10) and standing left adjacent the related latch (FIG. 31) so that on rightward shift (to be described) of bar 215, all the latches 69 are rocked counter-clockwise for releasing locked down keys 4, as explained hereinbefore. A shorter transverse bar 217 is slidably mounted at its right end on frame 51, and the left end of bar 217 is formed with a slot 218 for receiving stud 219 on bar 215 for slidable support of bar 217 on bar 215. A spring 220 is tensioned between the bars for holding the bars together at their slidable coupling, and for at times moving bar 215 rightward together with bar 217. Two studs, 221 and 222, are provided on bar 217. Stud 221 stands left adjacent hold-down latch 104 for add and subtract keys 20 and 21, FIG. 17, and stud 222 (FIG. 31) stands left adjacent bail 74 for hold-down latches 72 (FIG. 11) of keys 5, so that on rightward movement of bar 217, FIG. 31, latch 104 and bail 74 are rocked counter-clockwise. Such movement of latch 104, it will be recalled, allows the depressed one of the add or subtract keys to return up, and the counter-clockwise movement of the bail 74 rocks latches 72 (FIG. 11) for releasing the depressed one of keys 5 for values one to nine.

Bar 217 (FIG. 31) is shifted rightward as will be described, at the end of each cycle of operation of the multiplying power unit initiated by any one of the keys: add 20, subtract 21 and multiplier 5 for values one to nine; and bar 215 is prevented from moving rightward with bar 217, except when either add key 20 or subtract key 21 is the one depressed, as will now be described. Detent 223, FIG. 32, pivoted on depending bracket 224 secured to plate 46, is influenced clockwise by torsion spring 225 fastened thereto and the bracket, so that lateral lug 226 formed on the free end of the detent overlies bar 215 in the path of rightward movement of upright lug 227 on the bar, thereby blocking rightward shifting of the bar. In this position of detent 223, rightward sliding of bar 217 (FIG. 31) merely extends spring 220. The depending edge of detent 223 (FIG. 32) is formed with surface 228 which lies in the path of clockwise movement of vane 120, which, it will be recalled, is so moved in response to depression of either the add key 20 or subtract key 21. The relationship between vane 120 and surface 228 is such that on clockwise movement of the vane, detent 223 is moved upwardly or counter-clockwise sufficiently to move its lug 226 out of the path of lug 227 on bar 215. Then through spring 220 (FIG. 31) bar 215 is moved rightward with bars 217 to effect release of depressed keys 4 as explained.

Figure 34:
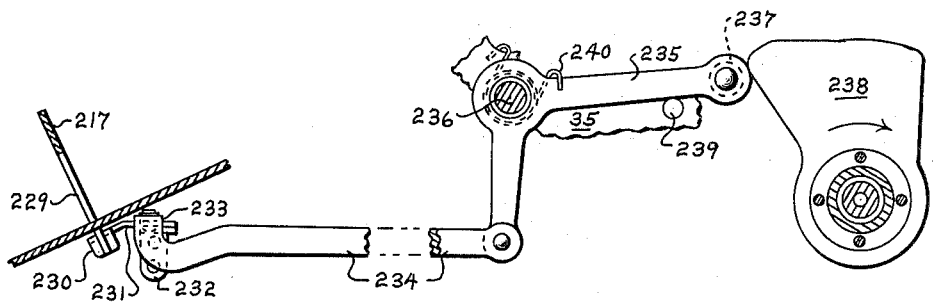
FIG. 34 is a condensed fragmentary right side sectional elevation of the power means for automatically operating the latch-down means of FIGURE 31.

For rightward shifting of the bar 217, the bar is formed with depending extension 229 which extends below frame plate 47 through a suitable slot thereon to situate in the path of counter-clockwise movement of lug 230 (FIG. 33) on the forwardly extending arm of bellcrank 231 which is pivoted on bracket 232 on frame plate 44. The other arm of the bellcrank extends rightward and is pivotally connected at its free end to bent over lug 233 on the forward end of link 234. The other end of link 234 (FIG. 34) is connected to the depending arm of bellcrank 235 pivotally mounted on shaft 236 on the machine frame. The rearwardly extending arm of bellcrank 235 carries roller 237 which lies in the path of clockwise turning of cam 238 of the multiplying power unit. This unit, as disclosed in the parent application, turns one revolution to effect a cycle of multiplying operations. The periphery of cam 238 is such that toward the end of its revolution the cam engages roller 237, for rocking bellcrank 235 counter-clockwise and for allowing the bellcrank to return shortly thereafter to rest position against stud 239 on frame 35, under the clockwise influence of torsion spring 240 fastened to the bellcrank and frame 35. Thus, through link 234, bellcrank 231 (FIG. 33) is first turned counter-clockwise to slide bar 217 (FIG. 31) rightward to effect release of depressed keys as described. Then bellcrank 231 (FIG. 33) is returned clockwise to the position in which it is illustrated, allowing bar 217 (FIG. 31) to be returned leftward by spring 220 when bar 215 has been blocked against rightward movement. When bar 215 is allowed to move rightward with bar 217, both bars are returned leftward by latches 69 which are influenced clockwise by their respective return spring 64, FIG. 6. At times, however, it may be preferred not to have the automatic clearing of keys 4 occur, and a selectively presettable lock means is provided for blocking rightward movement of bar 215, FIG. 31, as will be described.

Figure 35:
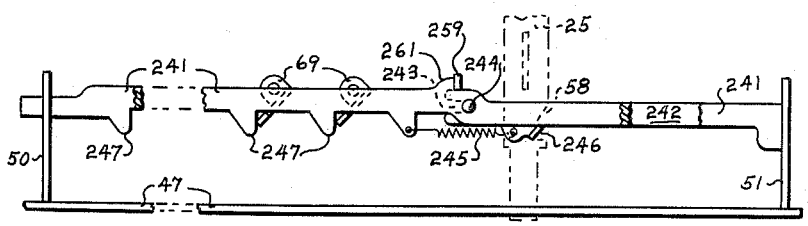
FIG. 35 is a condensed fragmentary front elevational view of the manually operated factor key clearing means with the keyboard clear key of FIGURE 1 shown in phantom.

The means for manually simultaneously clearing factor keys 4 comprises bars 241 (FIG. 35) and 242 and optionally depressable keyboard clear key 25, shown in phantom. Transverse bar 241 is slidably mounted on plates 50 and 51. The right end of relatively short transverse bar 242 is slidably mounted on plate 51 in back of and adjacent to bar 241, and the left end of bar 242 is formed with slot 243 for slidably being supported on stud 244 on bar 241. Spring 245 tensioned between bars 241 and 242 holds the bars together at their slidable coupling so that bar 241 normally moves rightward together with bar 242. Bar 242 is formed with a forwardly extending lug 246 which contacts incline 58 on key 25, so that on depression of the key, through lug 246 the incline moves bar 242 rightward and therewith moves bar 241. Bar 241 is formed with a plurality of depending lugs 247, one for each hold-down latch 69 and situated left adjacent thereto so that on rightward movement of bar 241 all hold-down latches 69 are rocked counter-clockwise whereby, as previously described, the latches are disengaged from the depressed keys 4 allowing them to be returned up by their respective springs. Upon release of key 25, bars 241 and 242 are returned leftward to their illustrated rest position by the hold-down latches 69 which as described, are spring influenced clockwise and force the lugs 247 leftward. When bar 241 is blocked against moving rightward, as will be described presently, coupling spring 245 is extended and thereby serves to return bar 242 leftward, from operated position. At times it may be preferred to retain a factor set up on keys 4 as a constant factor for several computations. In this event, accidental clearing of keys 4 by depression of key 25 would be undesirable. Hence the aforementioned presettable lock means is also devised so as to be settable for blocking rightward movement of bar 241, as will now be described.

Figure 36:
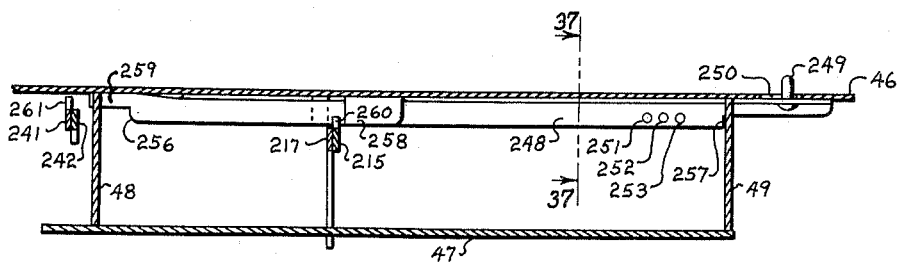
FIG. 36 is a sectional elevational right side view with parts omitted for clarity, and showing primarily the slide member operated by the N.R.C. (normal, repeat and constant) key of FIGURE 1 for controlling manual and automatic clearing of the factor keys.
Figure 37:
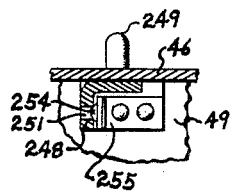
FIG. 37 is a fragmentary sectional elevational view of the spring detent for the slide member as seen substantially on plane 37—37 of FIGURE 36.

Lock bar 248 (FIG. 36) is slidably mounted on front and rear plates 48 and 49 in proximity to top plate 46. An upright member 249 is secured to bar 248 at its rearward end for movement therewith and extends through a suitable elongated slot 250 on plate 46 for manual endwise shifting of the bar. Three spaced holes or recesses 251, 252 and 253 are formed on bar 248, each for receiving, in a different one of three positions of the bar, the extruded portion 254 (FIG. 37) on the forward free end of spring detent 255 which is formed of any suitable flexible material and is secured to frame 49 so as to press against the bar to serve as a detaining spring therefor in each of the three positions of the bar. The arrangement is such that on shifting of the bar 248 from one position to the adjacent position, portion 254 seats in the hole relative to the position, which action affords the operator a "feel" of when the bar is properly in the respective position. In the illustrated position, portion 254 is seated in hole 251, whereat the bar is in normal position which is denoted by "N," visible on plate 46 (FIG. 1) right adjacent the member 249, and as indicated, the next position (forward therefrom) of the bar is the repeat or "R" position and still further forward is the constant position denoted by the letter "C." Sliding of the bar forward of the C position and rearward of the N position is positively blocked respectively by stop faces 256 (FIG. 36) and 257 formed on the bar. Plate member 48 stands in the path of face 256 to stop forward movement of bar 248 beyond constant position and plate 49 is in the path of face 257 to block rearward movement beyond normal position.

Bar 248 is formed with a lateral extension, the end portion of which is bent downwardly to form flange 258 parallel with the bar. In normal position of the bar, flange 258 and the forward end portion 259 of the bar stand rearwardly respectively of transverse bars 215 and 241. The arrangement is such that when bar 248 is moved forwardly from normal position to repeat position, flange 258 stands in the path of rightward movement of upright lug 260 (see also FIG. 31) formed on bar 215 to block rightward movement of the bar. Thus the automatic clearing of the factor keys at the end of operations initiated by either the add or subtract keys is prevented. In repeat position, end portion 259 is rearward of bar 241 so that manual clearing of the factor key by key 25 (FIG. 35) is possible. Flange 258 (FIG. 36) is of sufficient length to stand in the path of lug 260 when bar 248 is shifted further forward to constant position, whereat the forward portion 259 of the bar stands in the path of rightward movement of upright lug 261 on bar 241 to prevent rightward shifting of the bar 241 in response to depression of the keyboard clear key 25, FIG. 35. With both bars 215 and 241 blocked, automatic and an unwanted accidental manual clearing of the factor keys is prevented.

Although I have described a preferred embodiment of the invention, it is understood that this is by way of example only, and that various changes may be made in size, shape, materials and arrangement without departing from the spirit and scope of the invention as claimed.

What is claimed is:

1. In a calculating machine comprising a register, and a computing mechanism for performing arithmetical calculations of addition and subtraction and for normally yieldably operating said register to indicate the number of items added and subtracted in successive operations of said computing mechanism, a plus key means operable from a normal first position to a second position for controlling said mechanism to add, a minus key means operable from a normal first position to a second position for controlling said mechanism to subtract a non-entry key means operable from a normal first position to a second position for controlling said mechanism to omit said normal operation of said register, a lug means on each said key means, a slide bar means situated below said lug means of each said key means and movable from a normal central position selectively in opposite directions to second and third positions, said slide bar means comprising a first key-blocking surface normally located between said plus and minus key means and flanked by first and second opposingly declining angle surfaces originating directly under the lugs of said plus and minus key means, respectively, so that operation of said plus key means brings its said lug means into contact with the first of said angle surfaces and the interaction of said lug means with said angle surface moves said bar means to said second position at which said first key-blocking surface is situated in the path of the lug means of said minus key means for blocking operation thereof, and when said bar is in said normal position and said minus key means is operated to its second position its lug means coacts with said second declining angle surface for moving said bar means to said third position whereat said first key-blocking surface is situated in the path of the lug on said plus key means for blocking movement thereof, a second key-blocking surface on said bar means which is situated in the path of the lug means on said non-entry key means only when said bar means is in said third position whereby said non-entry key means is blocked in its ineffective first position when said minus key means is in its said second position.

2. The combination according to claim 1 wherein said slide bar means comprises an abutment means situated in alignment with the lug means on said non-entry key means in operated second position for blocking movement of said bar means to said third position and thereby, through contact of the lug and said second declining angle surface, prevents operation of said minus key means when said non-entry key means is operated.

3. The combination according to claim 1 and comprising a centralizing spring means for returning said slide bar means to its said normal central position.

4. In a calculating machine comprising a register, a plurality of rows control keys, and a computing mechanism operable under control of said control keys for performing arithmetical calculations of addition, multiplication and division and for normally yieldably operating said register to indicate the item, multiplier and quotient, respectively, a plus control key in a first said row operable from a normal position to an operated position for controlling said mechanism to add, a non-entry key means in said first row operable concurrently with said plus control key from a normal position to an operated position for preventing the normal operation of said register by said mechanism, said non-entry key means comprising an incline surface, at least one multiplication control key in a second said row operable from a normal position to an operated position for controlling said mechanism to multiply, said multiplication control key comprising an opposing incline surface, a division control key in a third said row operable from a normal position to an operated position for controlling said mechanism to divide, said division control key comprising a shoulder, a lock means between said non-entry key means and said multiplication control key and movable responsive to said opposing incline surface for contacting said non-entry key means at the origin of its said incline surface and thereby blocking operation of said non-entry key means with said multiplication control key, a division control key blocking means normally engaged with said shoulder and yieldably operable for disengaging from said shoulder and thereby allowing operation of said division control key, and a bar means interconnecting said blocking means and said lock means, said bar means being operable by said lock means in response to actuation by said incline surface upon operation of said non-entry key means for holding said blocking means against operation, and thereby preventing operation of said division control key concurrently with said non-entry key means.

5. The combination according to claim 4 wherein said incline surface of said non-entry key means, moves said lock means against the origin of said opposing incline surface of said multiplication control key, when said non-entry key means is moved to operated position, for preventing operation of said multiplication control key.

6. The combination according to claim 4 and comprising a blocking surface means on said division control key for blocking said division control key blocking means in operated position when said division control key is in operated position, said bar means being responsive to said division control key blocking means in operated position for holding said lock means against said non-entry key means at the origin of its said incline surface for thereby preventing operation of said non-entry key means with said division control key.

7. In a calculating machine comprising a carriage shiftable between extreme left and right positions, a carriage shifting mechanism operable for ordinally shifting said carriage, said mechanism comprising a change direction control means normally effective for leftward movement of said carriage and operable for effecting rightward movement of said carriage, and a differential position tabulating means operable by the shift of said carriage to its left and right extreme positions for terminating the operation of said shifting mechanism, an extreme left shift key means operable from a normal ineffective first position to a second position for effecting operation of said shifting mechanism, a left shift key means operable from an ineffective first position to a second position for effecting operation of said shifting mechanism and operable from its said second position to said first position for terminating the operation of said mechanism, a right direction shift key means operable from a first position to a second position for operating said change direction control means and for effecting operation of said mechanism, and operable from said second position to said first position for restoring said change direction means to normal and for terminating operation of said mechanism, an extreme right shift key means operable from a normal ineffective first position to a second position for operating said change direction control means and for effecting operation of said mechanism, a key blocking means operable by said extreme left shift key means upon movement thereof to its said second position for blocking operation of said extreme right shift key means and said right direction shift key means to said second position and operable by said extreme right shift key means upon movement thereof to said second position for blocking operation of said extreme left shift key means and said left direction shift key means, return spring means on each said key means for restoring each respective said key means to its said first position, and latch means for holding said extreme left and said extreme right shift key means upon operation thereof to their operated second positions and responsive to operation of said tabulating means for releasing an operated one of said extreme shift keys for return by its said return spring means.

8. The combination according to claim 7 and comprising a lug means on each of said key means, and a slide bar means situated below said lug means on each said key means and movable from a normal central position selectively in opposite directions to second and third positions, said slide bar means comprising a first pair of declining angle surfaces on said bar means in normal position, each angle surface being located under a said lug means on said extreme left shift key means and said left shift key means and situated so that operation of either left shift key means brings its lug means in contact and interaction with the respective one of said first pair of declining angle surfaces and moves said bar means to said second position, a first pair of key-blocking surfaces on said bar means in said second position thereof situated in the path of the lug means on each of said right shift key means for blocking operation thereof, a second pair of declining angle surfaces on said bar means in normal position thereof, each being located under the lug means on both said right shift key means for operation thereby upon operation of the respective one of said right shift keys for moving said bar means to said third position, a second pair of key-blocking surfaces on said bar means and being situated in the path of the lug means on each of said left shift key means for blocking operation thereof when said bar means is in said third position, whereby a said right shift key means can not be operated simultaneously with a said left shift key means.

9. The combination according to claim 8 and comprising a centralizing spring means for returning said slide bar means to its said normal central position.

10. In a calculating machine comprising an ordinally movable carriage, a carriage moving means operable for moving said carriage from one ordinal position to another, a cyclically operable mechanism for performing arithmetical calculations of multiplication and for sequentially controlling said carriage moving means to operate, said mechanism comprising predetermined representations selectable according to a multiplicand and settable in accordance with a multiplier upon movement from a neutral position in one direction for certain multipliers and in the opposite direction for certain other multipliers, a first plurality of control devices operable for controlling said mechanism and corresponding to said certain multipliers, a second plurality of control devices operable for controlling said mechanism and corresponding to said certain other multipliers, a zero value control device operable for controlling said carriage moving means to operate, and a plurality of lug means, one carried on each of said control devices, a slidable lock-member situated beneath said lug means and movable from a normal central position to first and second operated positions, said lock-member comprising a first plurality of spaced lug-blocking surfaces situated respectively in alignment with the lug means of said first plurality of control devices and said zero value control device for preventing operation of said zero value control device and said second plurality of control devices when said lock-member is in its said first operated position, a second plurality of spaced lug-blocking surfaces situated respectively in alignment with the lug means of said zero value control device and said second plurality of control devices for preventing operation of said zero value and said second plurality of control devices when said lock member is in its said second operated position, said lock-member having a slot therein in alignment with and for receiving the lug means on said zero value control device for allowing operation of said zero value device when said lock-member is in its normal central position and for preventing movement of said lock-member from said normal position when said zero value device is operated and its lug means has entered said slot, a first plurality of declining angle surfaces on said lock-member normally standing in alignment with a respective one of the lug means on said first plurality of control devices and responsive to operation of any of said first plurality of control devices for moving said lock-member to its said first operated position, a second plurality of declining angle surfaces on said lock-member normally standing in alignment with the lug means on said second plurality of control devices and responsive to operation of any of said second plurality of control devices for moving said lock-member to said first operated position.

11. In a calculating machine comprising a plurality of rows of individually operable factor setting devices for setting up number representations as factors of computations, each of said setting devices having a lower notch and an upper notch on one side of said setting devices, and a row of individually operable number representing computation control devices for controlling said machine to compute in accordance with the number representations of the operated said setting devices and the operated one of said control devices, each of said control devices comprising an incline surface on the side of each said control device, which side is opposite to said one side of said setting devices, a lock vane individual to each row of said setting devices and rockable into engagement with said lower notch of any said setting devices that are not operated and into engagement with the upper notches of any operated said setting devices for preventing change of a currently set-up number representation, a locking control member normally contacting said control devices at the origin of said incline surfaces and responsive thereto for operation upon operation of any one of said control devices, and a transverse bar means interconnecting all said lock vanes and said locking control member for operation in unison so that operation of one of said control devices moves its respective said incline surface against said locking control and thereby operates said lock vanes to enter said upper notches of the operated said setting devices and said lower notches of said setting devices that are not operated.

12. The combination according to claim 11 and comprising a blocking surface between said upper notch and said lower notch on each said setting device for preventing said rocking of its respective lock vane and for preventing operation of the interconnected said lock vanes, said transverse bar means, said locking control member, and for locking all said control devices against operation whenever any one of said setting devices is only partially operated.

13. In a cyclically operable calculating machine comprising a plurality of rows of individually operable factor setting devices for setting up number representations as factors of computations, each of said setting devices having a lower notch and an upper notch on one side of said setting devices, and an initiatory control device operable for cycling said machine which is then operable in accordance with the number representations of the operated said setting devices, said control device comprising an incline surface on the side of said control device, which side is opposite to said one side of said setting devices, a lock vane for and individual to each row of said setting devices and rockable into engagement with said lower notch of said setting devices that are not operated and into engagement with the upper notches of any operated said setting devices for preventing change of currently set up number representations, a locking control member normally contacting said control device at the origin of said incline surface and responsive thereto for operation upon operation of said control device, and a transverse bar means interconnecting all said lock vanes and said locking control member for operation in unison so that operation of said control device moves its said incline surface against said locking control member and thereby operates said lock vanes to enter said upper notches of the operated said setting devices and said lower notches of said setting devices that are not operated.

14. The combination according to claim 13 and comprising a blocking surface located between said upper notch and said lower notch on each said setting device for preventing said rocking of its respective lock vane and preventing operation of the interconnected said lock vanes, said transverse bar means, and said locking control member, and for locking initiatory control device against operation, when any one of said factor setting devices is only partially operated.

15. In a calculating machine cyclically operable for performing arithmetical calculations of addition, subtraction and multiplication and comprising a plus key means operable for controlling said machine to cycle for addition, a minus key means operable for controlling said machine to cycle for subtraction, at least one multiplication key means operable for controlling said machine to cycle for multiplication, a plurality of factor key means individually operable for representing and setting up factors of said calculations, spring means on each said key means for returning the respective said key means from operated position, lock means for releasably holding any of said key means in operated position upon operation of said key means, a first clearing means shiftable for releasing the said lock means of said plus, minus and multiplication key means, a second clearing means shiftable for releasing said factor key lock means, spring means interconnecting said first and second clearing means for biasing said second clearing means to follow said first clearing means when the latter is shifted, a latch means normally blocking shifting of said second clearing means and responsive to operation of said plus and minus key means for releasing said second clearing means, and a shifting device reciprocated once near the end of each said machine cycle of operation for shifting said first clearing means.

16. The combination according to claim 15 and comprising a lug on said second clearing means secured thereto for movement therewith, and a manipulative lug blocking means movable from an ineffective position to a position for blocking shifting of said lug and said second clearing means and thereby preventing automatic clearing of said factor key means when said plus, minus and multiplication keys are cleared.

17. In a calculating machine operable for performing arithmetical calculations and comprising a plurality of factor key means individually operable for representing factors of said calculations, first spring means on each of said key means for returning the respective said key means from operated position, lock means for releasably holding each said key means in operated position upon operation of said key means, a clear key means formed with an incline surface, a first bar means comprising a lug normally contacting said clear key means at the origin of said incline surface and responsive to said incline surface upon operation of said clear key means for shifting said first bar means, a second bar means contacting each said lock means and being shiftable for operating said lock means for thereby releasing all operated said factor key means for return by said first spring means, and second spring means connected between said first and second bar means for biasing said second bar means to follow said first bar means upon shifting thereof.

18. The combination according to claim 17 and comprising a projection on said second bar means for movement therewith and a manipulative projection blocking means movable from an ineffective position to a position for blocking shifting of said projection and said second bar means against response to random operation of said clear key means.

19. In a calculating machine cyclically operable for performing arithmetical calculations of addition, subtraction and multiplication, and comprising a plus key means operable for controlling said machine to cycle for addition, a minus key means operable for controlling said machine to cycle for subtraction, at least one multiplication key means operable for controlling said machine to cycle for multiplication, a plurality of factor key means individually operable for representing factors of said calculations, key return spring means on each said key means for returning the respective key means from operated position, first key lock means for releasably holding any operated said plus, minus and multiplication key means in operated position upon operation of the respective key means, second key lock means for releasably holding each said factor key means in operated position upon individual operation of the same, a first clearing means shiftable for releasing said first key lock means, a second clearing means shiftable for releasing said second key locking means, a first spring means interconnecting said first and second clearing means for biasing said second clearing means to follow said first clearing means when the latter is shifted, a latch means normally blocking shifting of said second clearing means and responsive to operation of said plus and minus key means for releasing said second clearing means to the biasing effect of said first spring means, an automatic shifting device reciprocated once near the end of each said machine cycle of operation for shifting said first clearing means, a clear key means formed with an incline surface, a third clearing means with a lug thereon normally contacting said clear key means at the origin of its said incline surface and responsive thereto upon operation of said clear key means for shifting said third clearing means, a fourth clearing means contacting each said second key lock means and being shiftable for operating said second key lock means and thereby releasing all operated said factor key means, a second spring means interconnecting said third and fourth clearing means for biasing said fourth clearing means to follow said third clearing means upon shifting thereof, a first projection on said second clearing means for movement therewith, a second projection on said fourth clearing means for movement therewith, and manipulative projection blocking means movable from an ineffective normal first position to a second position for blocking said first projection and said second clearing means against automatic shifting for operating said second key lock means and movable to a third position for blocking as in said second position and also blocking said second projection and said fourth clearing means against shifting and operation of said second key lock means.

20. In a calculating machine the combination of a plurality of factor setting devices operable from ineffective position to operated position for representing factors of a computation, each said setting device comprising a latch-down shoulder and a latch-up shoulder and a blocking edge therebetween; a first vane means comprising first flange means extending toward each of said setting devices and constructed and arranged for movement from normal ineffective position against said setting devices for engaging the said latch-down shoulders of all operated said setting devices, the said latch-up shoulders of all ineffective said setting devices, and, blocked in normal ineffective position of said first vane means, against said blocking edge of any partially operated said setting device or devices as the case may be; a flanged second vane means movable from a normal position to operated position, linkage means interconnecting said first and second vane means for simultaneous movement from normal to operated positions thereof, spring means for normally holding both said vane means in their normal positions, and at least one initiating device comprising an incline, the origin of which normally contacting the flange of said second vane means, said initiating device being operable from normal position to operated position for moving said incline against the flange of said second vane means and thereby moving said second vane means and the interconnect said first vane means to operated position with said first flange means engaging said shoulders of said setting devices and thereby maintaining the represented factor in said setting devices, and for initiating a computation operation in said machine.

21. The combination according to claim 20 wherein said blocking edge of any partially operated said setting devices blocks said first vane means and the interconnected said second vane means in normal position and, through coaction of said second vane and said incline, prevents operation of said initiating device for preventing initiation of a computation operation in said machine when a factor is not properly represented by said setting devices.

22. In a calculating machine the combination of a plurality of factor setting devices operable from ineffective position to operated position for representating factors of a computation, each said setting device comprising a latch-down shoulder and a latch-up shoulder; a first vane means constructed and arranged for movement from normal ineffective position against said setting devices for engaging the said latch-down shoulders of all operated said setting devices and the said latch-up shoulders of all ineffective said setting devices; a second vane means movable from a normal position to operated position, linkage means interconnecting said first and second vane means for simultaneous movement in unison from normal to operated positions thereof; and at least one initiating device comprising an incline, the origin of which normally contacting said second vane means, said initiating device being operable from normal position to operated position for moving said incline against said second vane means and thereby moving said second vane means and the interconnected said first vane means to operated position for engaging said shoulders of said setting devices and thereby maintaining the represented factor in said setting devices, and for initiating a computation operation in said machine.

23. In a calculating machine the combination of a plurality of factor setting devices operable from ineffective position to operated position for representing factors of a computation, each said setting device comprising a latch-down shoulder and a latch-up shoulder, and a blocking edge therebetween; a first vane means constructed and arranged for movement against said blocking edge of any partially operated said setting device, and for movement from normal ineffective position to operated position for engaging the said latch-down shoulders of all operated said setting devices and the said latch-up shoulders of all ineffective said setting devices; a second vane means movable from a normal position to operated position, linkage means interconnecting said first and second vane means for simultaneous movement in unison from normal to operated position thereof; and at least one initiating device comprising an incline, the origin of which normally contacting said second vane means, said initiating device being operable from normal position to operated position for initiating a computation operation in said machine and for moving said incline against said second vane means and thereby moving said second vane means and the interconnected said first vane means to operated position for engaging said shoulders of said setting devices and thereby maintaining the represented factor in said devices, said initiating device being blocked against operation by coaction of said incline with said second vane means in normal position when the interconnected said first vane means is blocked in normal position by the blocking edge of any partially operated said setting device.

24. In a calculating machine the combination of divisor setting devices operable from ineffective position to operated position for representing the divisors in division computations, each said setting device comprising a latch-down shoulder and a latch-up shoulder; a lock means constructed and arranged for movement from normal ineffective position against said setting devices for engaging the said latch-down shoulders of operated said setting devices and the said latch-up shoulders of ineffective said setting devices; a follower means movable from a normal position to operated position, linkage means interconnecting said lock means and said follower means for simultaneous movement thereof in unison from normal to operated positions, and at least one division operation initiating device comprising an incline normally contacting said follower at the origin of said incline, said initiating device being operable from normal position to operated position for moving said incline against said follower and thereby moving said follower and the interconnected said lock means to operated position for engaging said lock means with said shoulders of said setting devices and thereby maintaining the represented divisor in said setting devices, and operable for initiating division computation operations in said machine.

25. In a calculating machine the combination of divisor setting devices operable from inffective position to operated position for representing the divisors in division computations, each said setting device comprising a latch-down shoulder, a latch-up shoulder and a blocking surface therebetween; a lock means normally standing in proximity with said blocking surface of any partially operated said setting device and normally movable from normal position into engagement with said latch-up shoulders of ineffective said setting devices and into engagement with said latch-down shoulders of operated said setting devices; a follower means movable from a normal position to operated position, linkage means interconecting said lock means and said follower means for simultaneous movement thereof in unison from normal to operated positions, and at least one division operation initiating device comprising an incline normally contacting said follower at the origin of said incline, said initiating device being operable from normal position to operated position for moving said incline against said follower and moving said follower and the interconnected said lock means from normal to operated positions for engaging said shoulders and thereby securing the divisor in said setting devices, said initiating device being blocked in normal position by coaction of said incline and said follower when any of said setting devices are partially operated and said blocking surface thereof blocks movement of said lock means from normal position.

26. A machine comprising a plurality of setting devices operable from ineffective position to operated position for representing factors, a plurality of setting device lock means for holding operated said setting devices in operated position, said lock means being operable for releasing all operated said setting devices for return thereof to said ineffective position, plus and minus controls individually operable from ineffective normal position to operated position for respectively initiating adding and subtracting operations of said machine, plus and minus lock means for holding operated said controls in operated position during the respective operation of said machine and being operable for releasing said controls, a control clearing mechanism automatically operable during said adding and subtracting operations of said machine for operating said control lock means to release an operated said control, a factor clearing mechanism yieldably connected to said control clearing mechanism for simultaneous automatic operation therewith for operating said setting device lock means to release all operated said setting devices, a manual clearing device independently operable for operating said setting device lock means to release all operated said setting devices, and a clearing control means settable in an ineffective first position, settable in a second position for blocking the automatic operation of said factor clearing mechanism and settable in a third position for blocking the automatic operation of said factor clearing mechanism and for blocking operation of said manual clearing device.

27. The combination according to claim 26 wherein said machine comprises a power mechanism controlled by said plus and minus controls for performing the computation initiated by an operated said control and for operating said control clearing mechanism.

28. The combination according to claim 26 wherein said manual clearing device comprises a bar means normally held in ineffective position by said setting device lock means and operable for operating said setting device lock means to release all operated said setting devices, said bar means comprising lug means engageable by said clearing control means in said third position thereof for blocking operation of said bar means, key means movable from ineffective position to operated position, and a yieldable connection between said key means and said bar means for normally operating said bar means upon operation of said key means and being yieldable upon operation of said key means when said clearing control means blocks said bar means.

29. In a calculating machine the combination of a movable register and a register carriage therefor movable for differentially coordinating the ordinal relationship of said register in said machine and wherein a number is entered as a dividend, a plurality of real digit setting devices operable from ineffective position to operated position for representating a divisor, a dividing mechanism operable for automatically dividing the dividend in said register by the divisor represented by said setting devices, a plurality of operation controls individually operable from ineffective position to operated position for causing respective operations in said machine, said operation controls including a division operation control operable as aforesaid for immediately starting operation of said dividing mechanism, a locking device normally blocking operation of said division operation control and operable for permitting operation of said division operation control, locking means normally permitting operation of said locking device and directly responsive to operation of any one of said operation controls, exclusive of said division operation control, for blocking operation of said locking device, a blocking means normally blocking operation of said locking device and responsive to the movement of said carriage to the highest ordinal relationship of said register for releasing said locking device for operation, and a yieldable locking device operating means directly responsive to operation of any one of said setting devices for operating said locking device when said locking device is not otherwise blocked against operation, whereby said division operation control cannot be operated to initiate operation of said dividing mechanism when said dividend register is not in its highest ordinal position, when a divisor is not set in said setting devices, and/or when another of said operation controls is operated.

30. The combination according to claim 29 and including an abutment means on said division operation control in operated position thereof for abutting said locking device and holding said locking device in normal position and preventing said response of said locking means whereby said operation controls, exclusive of said division operation control, are held in ineffective position while said division operation control is in operated position.

31. The combination according to claim 29 wherein said setting devices are restricted to the highest order of a greater plurality of orders of setting devices and the first real digit of a divisor set therein is restricted to the highest order said setting devices for operating said yieldable locking device operating means and said locking device, and the succeeding orders of the divisor are restricted to the highest orders of said greater plurality of orders of setting devices for assuring the greatest capacity of said machine.

32. In a calculating machine, the combination of a multiorder register, a register carriage supporting said register and movable therewith for differentially coordinating the ordinal relationship of said register in said machine, a dividing mechanism operable for automatically dividing a dividend in said register by a divisor and sequentially moving said carriage for successively coordinating lower orders of said register, a manipulative division operation control operable from normal ineffective position to operated position for starting operation of said dividing mechanism, and locking means normally in blocking engagement with said division operation control for preventing operation of said division operation control and being operable by said carriage upon movement thereof to the highest ordinal position of said register for releasing said division operation control, whereby said division operation control is blocked against operation when said carriage is out of its highest ordinal position and said division operation control is only operable when said carriage is in the highest ordinal position of said register.

33. In a calculating machine, the combination of a multiorder register, a register carriage supporting said register and movable therewith for differentially coordinating the ordinal relationship of said register in said machine; a dividing mechanism operable for automatically dividing a dividend in said register by a divisor, and comprising a carriage moving means operable for moving said carriage to coordinate various orders of said register in said machine and operable under control of said dividing mechanism in division operations thereof for sequentially moving said carriage for successively coordinating lower orders of said register in said machine; a manipulative division operation control operable for ineffective position to operated position for starting sequential operations of said dividing mechanism and said carriage moving means, locking means normally in blocking engagement with said division operation control for preventing operation of said division operation control and being operable by said carriage upon movement thereof to the highest ordinal position of said register for releasing said division operation control, whereby said division operation control is blocked against operation when said carriage is out of its highest ordinal position and said division operation control is only operable when said cairage is in the highest ordinal position of said register, and a divide position device for controlling said carriage moving means to move said carriage to the highest ordinal position of said register upon actuation of said device, thereby to effect operation of said locking means for allowing manipulative operation of said division operation control, as aforesaid.

34. In a calculating machine in which there is a dividing means for automatically performing division operations upon being brought into operation, a plurality of ordinally arranged rows of factor key means wherein a multi-digit divisor may be entered as a factor in said division operations, said plurality of said factor key means comprising a highest ordinal row of real digit factor key devices individually operable from normal ineffective position to operated position for representing a respective highest order real digit of a divisor, division initiating means constructed and arranged in said machine for movement from a normal ineffective position to operated position for thereby bringing said dividing means into operation, and locking means, normally in blocking engagement with said division initiating means and normally contacting all of said factor key devices of only the highest ordinal row of said factor key means when said factor key devices are in their respective ineffective positions, said locking means being operable by any one of said factor key devices upon operation of any one of said factor key devices to operated position for disengaging said locking means from said blocking engagement with said division initiating means, whereby said division initiating means may be moved to operated position for bringing said dividing means into operaton only after the highest order of a divisor is entered in the highest ordinal row of said factor key means by operation of one of said factor key devices to operated position.

35. In a calculating machine, the combination of a multiorder register, a register carriage supporting said register and movable therewith for differentially coordinating the ordinal relationship of said register in said machine, a plurality of factor key means comprising a highest ordinal row of real digit factor key devices individually operable from normal ineffective position to operated position for representing a respective highest order real digit of a divisor, a dividing mechanism operable for automatically dividing a dividend in said register by a divisor in said factor key means and sequentially moving said carriage for successively coordinating lower orders of said register in division operations, a manipulative division operation control operable from normal ineffective position to operated position for starting operation of said dividing mechanism, locking means normally in blocking engagement with said division operation control for preventing operation of said division operation control and being movable from blocking engagement with said division operation control to ineffective position for permitting operation of said division operation control, a holding means normally holding said locking means in said blocking engagement with said division operation control and being movable by said carriage upon movement thereof to the highest ordinal relationship position of said register for releasing said locking means and permitting movement of said locking means to its said ineffective position, and yieldable lock moving means operatively connected with said locking means and being responsive only to operation of any one of said real digit factor key devices in the highest order of said factor key means for yieldably moving said locking means to said ineffective position, whereby said locking means is moved to said ineffective position and said division operation control may be operated to operated position for starting division operations by said dividing mechanism only when said carriage is moved to coordinate the highest order of said register in said machine and a real digit factor key device in the highest order of said factor key means is in operated position for representing the highest order real digit of a divisor.

References Cited in the file of this patent

UNITED STATES PATENTS

| | | |
|---|---|---|
| 1,468,992 | Chase | Sept. 25, 1923 |
| 1,853,050 | Horton | Apr. 12, 1932 |
| 1,920,328 | Shipley | Aug. 1, 1933 |
| 2,121,683 | Britten | June 21, 1938 |
| 2,294,083 | Friden | Aug. 25, 1942 |
| 2,297,243 | Pott | Sept. 29, 1942 |
| 2,335,282 | Jessup et al. | Nov. 30, 1943 |
| 2,362,633 | Hilder | Nov. 14, 1944 |
| 2,382,661 | Pott | Aug. 14, 1945 |
| 2,408,097 | Pott | Sept. 24, 1946 |
| 2,467,419 | Avery | Apr. 19, 1949 |
| 2,636,677 | Gang | Apr. 28, 1953 |
| 2,689,085 | Avery | Sept. 14, 1954 |